(12) United States Patent
Hiraoka et al.

(10) Patent No.: US 7,967,232 B2
(45) Date of Patent: Jun. 28, 2011

(54) SPINNING-REEL FISHING LINE GUIDE MECHANISM

(75) Inventors: Hirokazu Hiraoka, Osaka (JP); Keigo Kitajima, Osaka (JP); Shingo Matsuo, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/880,593

(22) Filed: Sep. 13, 2010

(65) Prior Publication Data

US 2011/0095118 A1 Apr. 28, 2011

(30) Foreign Application Priority Data

Oct. 28, 2009 (JP) ................................. 2009-247563
Oct. 28, 2009 (JP) ................................. 2009-247564

(51) Int. Cl.
*A01K 89/01* (2006.01)
(52) U.S. Cl. ................... 242/231; 242/230; 242/232
(58) Field of Classification Search .................. 242/230, 242/231, 232
See application file for complete search history.

(56) References Cited

U.S. PATENT DOCUMENTS

| | | | | |
|---|---|---|---|---|
| 6,161,786 A * | 12/2000 | Ohara et al. | ............. | 242/231 |
| 6,899,295 B2 | 5/2005 | Okada et al. | | |
| 6,929,204 B2 * | 8/2005 | Iwabuchi et al. | ............. | 242/231 |
| 7,007,880 B2 * | 3/2006 | Ikuta | ............. | 242/230 |
| 7,137,585 B2 * | 11/2006 | Ochiai | ............. | 242/231 |
| 7,665,683 B2 * | 2/2010 | Ochiai et al. | ............. | 242/231 |
| 2003/0066919 A1 * | 4/2003 | Ikuta et al. | ............. | 242/231 |
| 2004/0041043 A1 * | 3/2004 | Sugawara et al. | ............. | 242/231 |
| 2004/0124298 A1 | 7/2004 | Okada et al. | | |

FOREIGN PATENT DOCUMENTS

| | | |
|---|---|---|
| JP | H10-234277 A | 9/1998 |
| JP | 2000-102334 A | 4/2000 |
| JP | 2000-217474 A | 8/2000 |
| JP | 2003-158964 A | 6/2003 |

OTHER PUBLICATIONS

Extended European Search Report of corresponding EP Application No. 10 18 7286.9 dated Feb. 14, 2011.

* cited by examiner

*Primary Examiner* — Emmanuel M Marcelo
(74) *Attorney, Agent, or Firm* — Global IP Counselors, LLP

(57) ABSTRACT

In a bail arm of a spinning reel, a first bail support member includes a through hole penetrating therethrough toward an inner periphery of the roller from outside. A cap member made of a synthetic resin is attached to the through hole. The cap member includes a lubricating port to supply a lubricant therethrough. Further in the bail arm of a spinning reel, a first lubricating port is formed in a first rotation support portion configured to be exposed to the outside in a fishing line release posture of the first bail support member. The first lubricating port continuously penetrates inner and outer peripheries of the first rotation support portion.

17 Claims, 16 Drawing Sheets

SPINNING-REEL FISHING LINE GUIDE MECHANISM

CROSS-REFERENCE TO RELATED APPLICATIONS

This application claims priority to Japanese Patent Application Nos. 2009-247563 filed on Oct. 28, 2009 and 2009-247564 filed on Oct. 28, 2009, the entirety of which are hereby incorporated by reference.

BACKGROUND

1. Field of the Invention

The present invention relates to a fishing line guide mechanism, more specifically, to a spinning-reel fishing line guide mechanism configured to guide a fishing line onto a spool, which is attached to a distal end of a first rotor arm and configured to pivot between a fishing line guide posture and a fishing line release posture.

2. Background Information

Spinning reels normally include a fishing line guide mechanism attached to a distal end of a rotor for guiding a fishing line onto a spool. The rotor includes a cylindrical portion, a first rotor arm, and a second rotor arm. The cylindrical portion is rotatably attached to a reel unit. The first and second rotor arms are integrally formed while being opposed to each other in the rear part of the cylindrical part. The fishing line guide mechanism is attached to the distal ends of the first and second rotor arms while being configured to pivot between a fishing line guide posture and a fishing line release posture. The fishing line guide mechanism of the aforementioned type includes a first support member, a second support member, and a bail. The first support member is pivotably attached to the first rotor arm, whereas the second support member is pivotably attached to the distal end of the second rotor arm. The bail couples the first and second support members. Further, a line roller, a fixation shaft, and a fixation shaft cover are attached to the distal end of the first support member. The line roller is configured to guide a fishing line. A pair of the fixation shaft and the fixation shaft cover is configured to support the line roller. One end of the bail is fixed to the fixation shaft cover, whereas the other end of the bail is fixed to the second support member by means of caulking. For example, the aforementioned structure is described in Japan Laid-open Patent Application Publication Nos. JP-A-2000-102334 and JP-A-H10-234277.

In a fishing line guide mechanism described in Publication No. JP-A-2000-102334, a line roller is a tubular member rotatably attached to the outer peripheries of a fixation shaft and a fixation shaft cover, both of which are fixed to the distal end of a first support member by means of a bolt member. Further, a lubricant, e.g., lubricating oil, is supplied to the inner periphery of the line roller for smooth rotation of the line roller.

In a fishing line guide mechanism described in Publication No. JP-A-H10-234277, on the other hand, a first support member is pivotably attached to the distal end of a first rotor arm by means of a bolt member, i.e., an attachment pin, screwed therein, whereas a second support member is pivotably attached to the distal end of a second rotor arm by means of a bolt member, i.e., an attachment pin, screwed therein. A lubricant, e.g., lubricating oil, is supplied between the first support member and the distal end of the first rotor arm for smooth pivoting of the first support member. Similarly, a lubricant, e.g., lubricating oil, is supplied between the second support member and the distal end of the second rotor arm for smooth pivoting of the second support member.

According to the fishing line guide mechanism described in Publication No. JP-A-2000-102334, the lubricant is supplied to the inner periphery of the line roller under a condition in which a pair of the fixation shaft and the fixation shaft cover is disassembled by removing the bolt member from the first support member. In this case, the pair of the fixation shaft and the fixation shaft cover is required to be disassembled every time lubricant is supplied to the line roller. Further, some components forming the line roller, e.g., the bolt member, are normally small. When disassembling the fixation shaft and the fixation shaft cover, an angler may lose the line-roller related components and/or reassemble the disassembled components in a wrong assembling order and/or in wrong assembling orientations.

According to the well-known fishing line guide mechanism described in Publication No. JP-A-H10-234277, on the other hand, the lubricant is supplied between the first support member and the distal end of the first rotor arm under a condition in which the first support member is disassembled from the first rotor arm by removing the bolt member from the distal end of the first rotor arm. In this case, the first support member is required to be disassembled from the first rotor arm every time the lubricant is supplied. In many cases, the bolt member is tightly fastened therein with a high torque for preventing the bolt member from being loosened while rewinding the fishing line with a heavy load. When an angler removes the bolt member for disassembling the first support member, a tool-engaged portion of the bolt member may be damaged and/or the bolt member may be easily loosened due to lack of torque required to fasten the bolt member when reassembling the first support member. Further, when the first support member is strongly pulled while disassembling the first support member, the first support member may be deformed. This may result in an imbalance in rotation of the rotor.

In view of the above, the present invention addresses a need for producing a spinning-reel fishing line guide mechanism that easily supplies a lubricant onto or in the inner periphery of the line roller without disassembling the first support member and/or a pair of the fixation shaft and the fixation shaft cover.

Further, the present invention addresses a need for producing a spinning-reel fishing line guide mechanism to supply easily a lubricant between the first support member and the first rotor arm without disassembling the first support member and the first rotor arm.

This invention addresses these needs in the art as well as other needs, which will become apparent to those skilled in the art from this disclosure.

SUMMARY

A spinning-reel fishing line guide mechanism according to a first aspect is configured to guide a fishing line onto a spool. The spinning-reel fishing line guide mechanism is attached to a distal end of a first rotor arm. The spinning-reel fishing line guide mechanism is configured to pivot between a fishing line guide posture and a fishing line release posture. The spinning-reel fishing line guide mechanism includes a first support member, a fixation shaft, a fixation shaft cover, a line roller, a through hole, and a cap member. The first support member is pivotably attached to the distal end of the first rotor arm. The fixation shaft is fixed to the first support member with one of the axial ends thereof. The fixation shaft cover is attached to the other of the axial ends of the fixation shaft. The fixation shaft cover is separated from the first support member by a predetermined interval. The fixation shaft cover includes an outer periphery that allows the fishing line to be led onto the line roller. The line roller is rotatably supported by the fixation shaft. The line roller includes a roller on a circumference thereof. The roller is configured to guide the fishing line. Either the first support member or a pair of the fixation shaft and the fixation shaft cover has the through hole. The through hole makes an inner periphery of the roller extends toward the inner periphery of the roller from the outside. The cap member is attached to the through hole to close the through hole. The cap member includes a lubricating port allowing a lubricant to be supplied therefrom. The cap member is made of a synthetic resin.

According to the spinning-reel fishing line guide mechanism of the first aspect, the through hole is formed in either the first support member or a pair of the fixation shaft and the fixation shaft cover. The through hole penetrates either the first support member or the pair of the fixation shaft and the fixation shaft cover to make the inner periphery of the roller of the line roller extends toward the inner periphery of the roller from the outside. Further, the cap member is attached to the through hole. The cap member is made of a synthetic resin, e.g., synthetic rubber, and includes the lubricating port to supply the lubricant therethrough. In this case, the lubricant is supplied to the inner periphery of the line roller through the lubricating port exposed to the outside. Unlike well-known fishing line guide mechanisms, supply of the lubricant is herein achieved without disassembling the first support member and/or the pair of the fixation shaft and the fixation shaft cover. Therefore, loss of various components of the line roller is prevented. Further, the lubricant can be easily supplied to the inner periphery of the line roller without disassembling the first support member and/or the pair of the fixation shaft and the fixation shaft cover.

A spinning-reel fishing line guide mechanism according to a second aspect relates to the spinning-reel fishing line guide mechanism according to the first aspect, wherein the through hole is formed in the first support member. According to the spinning-reel fishing line guide mechanism of the second aspect, the through hole is formed in the first support member relatively larger than the fixation shaft and the fixation shaft cover. Therefore, assembling, e.g., attachment of the cap member, can be easily done. Further, the through hole is formed in the first support member while penetrating the inner and outer sides of the first support member. Yet further, the lubricating port is formed to be exposed to the outside of the first support member. The first support member herein separates the outwardly exposed lubricating port away from the spool disposed inside of the spinning-reel fishing line guide mechanism. When the rotor splashes water on the spinning-reel fishing line guide mechanism, the splashed water is prevented from easily entering the lubricating port.

A spinning-reel fishing line guide mechanism according to a third aspect relates to the spinning-reel fishing line guide mechanism according to the second aspect, wherein the first support member includes a recess that is inwardly recessed. The recess surrounds a part of the first support member where the fixation shaft is attached. Further, the through hole is formed in the recess and arranged in a vicinity of the part of the first support member where the fixation shaft is attached. According to the spinning-reel fishing line guide mechanism of the third aspect, the through hole is formed in the recess and arranged in the vicinity of the part of the first support member where the fixation shaft is attached. In other words, the through hole is arranged in the recess while not being easily noticeable from outside. It is thereby possible to inhibit the negative impact of the through hole on the external design to the minimum extent.

A spinning-reel fishing line guide mechanism according to a fourth aspect relates to the spinning-reel fishing line guide mechanism according to one of the first to third aspects, wherein the lubricating port is a through hole having a diameter that is relatively small but large enough to allow insertion of a lubricating nozzle. According to the spinning-reel fishing line guide mechanism of the fourth aspect, the lubricating port is a through hole having a diameter that is relatively small but large enough to allow insertion of the lubricating nozzle having a relatively small outer diameter. When supplied through the lubricating port, the lubricant is prevented from easily leaking to the outside. Simultaneously, salt, dirt, and the like can be prevented from easily entering the inside of the lubricating port.

A spinning-reel fishing line guide mechanism according to a fifth aspect relates to the spinning-reel fishing line guide mechanism according to one of the first to fourth aspects, wherein the cap member is attached to the through hole from an inner peripheral side of the roller. According to the spinning-reel fishing line guide mechanism of the fifth aspect, the cap member is attached to the through hole from the inner peripheral side of the roller. Accordingly, the cap member can be disposed not to be exposed to the outside. Therefore, damage and deterioration of the cap member can be prevented.

A spinning-reel fishing line guide mechanism according to a sixth aspect relates to the spinning-reel fishing line guide mechanism according to the fifth aspect, wherein the cap member is retained by a plate shaped retainer member. According to the spinning-reel fishing line guide mechanism of the sixth aspect, the cap member can be easily retained and appropriately positioned by attaching the plate shaped retainer member to either the inside of the first support member or the insides of the fixation shaft and the fixation shaft cover under a condition in which the plate shaped retainer member abuts the inner surface of the cap member.

A spinning-reel fishing line guide mechanism according to a seventh aspect relates to the spinning-reel fishing line guide mechanism according to one of the first to sixth aspects, wherein the cap member is a tubular member including the lubricating port in a center part thereof. According to the spinning-reel fishing line guide mechanism of the seventh aspect, a tubular member or an annular member, for instance, can be used as the cap member. The tubular member herein includes a narrow lubricating port in the center part thereof. On the other hand, the annular member is, for instance, an O-ring having a hollow as a lubricating port in the center part thereof.

A spinning-reel fishing line guide mechanism according to an eighth aspect relates to the spinning-reel fishing line guide mechanism according to one of the first to seventh aspects, wherein the line roller further includes a tubular member. The tubular member is attached to the inner periphery of the roller as an individual component. The tubular member includes a cutout communicating with the through hole and the inner periphery of the roller. According to the spinning-reel fishing line guide mechanism of the eighth aspect, even when a tubular member is interposed as a spacer between the inner periphery of the roller and the outer periphery of the fixation shaft or the case in which when a bearing is attached onto the outer periphery of the fixation shaft and the tubular member is interposed as a spacer between the inner periphery of the roller and the outer periphery of the bearing), the lubricant can be easily supplied to the inner periphery of the line roller by forming the cutout in the tubular member to communicate with the through hole and the inner periphery of the roller.

A spinning-reel fishing line guide mechanism according to a ninth aspect relates to the spinning-reel fishing line guide mechanism according to one of the first to eighth aspects, wherein the spinning-reel fishing line guide mechanism further includes a first lubricating port to supply the lubricant therethrough. The first lubricating port is formed in a first rotation support portion of the first rotation member. The first lubricating port continuously penetrates inner and outer peripheries of the first rotation support portion. The first rotation support portion is configured to be exposed to the outside while the first support member is in the fishing line release posture.

According to the spinning-reel fishing line guide mechanism of the ninth aspect, the first lubricating port is formed in the first rotation support portion configured to be exposed to the outside while the first support member is in the fishing line release posture, while penetrating the inner and outer peripheries of the first rotation support portion. When the lubricant is herein supplied between the first support member and the first rotor arm, the first support member is pivoted to the fishing line release posture. The first lubricating port is thereby exposed to the outside. The lubricant is supplied to the inner periphery of the first rotation support portion through the exposed first lubricating port. Unlike well-known fishing line guide mechanisms, supply of the lubricant is achieved without disassembling the first support member. Therefore, the lubricant can be easily supplied between the first support member and the first rotor arm without disassembling the first support member and the first rotor arm.

A spinning-reel fishing line guide mechanism according to a tenth aspect relates to the spinning-reel fishing line guide mechanism according to the ninth aspect, wherein the first lubricating port is a through hole having a diameter that is relatively small but large enough to allow insertion of a lubricating nozzle. According to the spinning-reel fishing line guide mechanism of the tenth aspect, the first lubricating port is a through hole having a diameter that is relatively small but large enough to allow insertion of the lubricating nozzle having a relatively small outer diameter. When supplied through the first lubricating port, the lubricant is prevented from easily leaking to the outside. Simultaneously, salt, dirt, and the like can be prevented from easily entering the inside of the first lubricating port.

A spinning-reel fishing line guide mechanism according to an eleventh aspect relates to the spinning-reel fishing line guide mechanism according to the tenth aspect, wherein the first rotation support portion includes an inner flanged portion, an outer flanged portion, and a hollow portion. The inner flanged portion protrudes toward the inner periphery of the first rotation support portion. The outer flanged portion protrudes toward the outer periphery of the first rotation support portion. The hollow portion is formed between the inner flanged portion and the outer flanged portion. The first lubricating port includes a first through hole and a second through hole. The first through hole is formed in the inner flanged portion. The second through hole is formed in the outer flanged portion. The second through hole communicates with the hollow portion and the first through hole. According to the spinning-reel fishing line guide mechanism of the eleventh aspect, the first lubricating port can be produced by forming the first through hole and the second through hole in the first rotation support portion having the hollow portion in the interior thereof.

A spinning-reel fishing line guide mechanism according to a twelfth aspect relates to the spinning-reel fishing line guide mechanism according to one of the ninth to eleventh aspects, wherein the first lubricating port is formed in the first rotation support portion configured not to be exposed to the outside in the fishing line guide posture. According to the spinning-reel fishing line guide mechanism of the twelfth aspect, the first lubricating port is configured not to be exposed to the outside in the fishing line guide posture of the first support member. An individual member, e.g., a cap member, is not further required to close the lubricating port.

A spinning-reel fishing line guide mechanism according to a thirteenth aspect relates to the spinning-reel fishing line guide mechanism according to one of the first to twelfth aspects. The spinning-reel fishing line guide mechanism further includes a second support member and a bail. The second support member is attached to a distal end of a second rotor arm opposed to the first rotor arm through a rotational axis of a rotor. The second support member is configured to pivot between the fishing line guide posture and the fishing line release posture. The bail is fixed to the second support member and at least one of the fixation shaft and the fixation shaft cover with both ends thereof. The bail is disposed on the outside of a circumference of the spool in a curved shape. The bail is configured to guide the fishing line onto the line roller through the fixation shaft cover. The spinning-reel fishing line guide mechanism of the thirteenth aspect can be applied to any suitable fishing line guide mechanism as long as the fishing line guide mechanism includes the second support member and the bail.

A spinning-reel fishing line guide mechanism according to a fourteenth aspect relates to the spinning-reel fishing line guide mechanism according to the thirteenth aspect, wherein the spinning-reel fishing line guide mechanism further includes a second lubricating port to supply the lubricant therethrough. The second lubricating port is formed in a second rotation support portion of the second support member. The second lubricating port continuously penetrates inner and outer peripheries of the second rotation support portion. The second rotation support portion is configured to be exposed to the outside in the fishing line release posture of the second support member. According to the spinning-reel fishing line guide mechanism of the fourteenth aspect, the spinning-reel fishing line guide mechanism includes the second lubricating port in addition to the first lubricating port. The lubricant can be thereby easily supplied between the second support member and the second rotor arm without disassembling the second support member.

A spinning-reel fishing line guide mechanism according to a fifteenth aspect relates to the spinning-reel fishing line guide mechanism according to the fourteenth aspect, wherein the second lubricating port is a through hole having a diameter that is relatively small but large enough to allow insertion of a lubricating nozzle. According to the spinning-reel fishing line guide mechanism of the fifteenth aspect, the second lubricating port is a through hole having a diameter that is relatively small but large enough to allow insertion of the lubricating nozzle having a relatively small outer diameter. When supplied through the second lubricating port, the lubricant is prevented from easily leaking to the outside. Simultaneously, salt, dirt, and the like are prevented from easily entering the inside of the second lubricating port.

A spinning-reel fishing line guide mechanism according to a sixteenth aspect relates to the spinning-reel fishing line guide mechanism according to the fifteenth aspect, wherein the second rotation support portion includes a main body joined to the inner and outer peripheries thereof. Further, the second lubricating port is a through hole penetrating the inner and outer peripheries of the main body. According to the spinning-reel fishing line guide mechanism of the sixteenth aspect, the second lubricating port can be produced by forming a through hole in the second rotation support portion including a main body joined to the inner and outer peripheries thereof without including a hollow portion in the interior thereof.

A spinning-reel fishing line guide mechanism according to a seventeenth aspect is configured to guide a fishing line onto a spool. The spinning-reel fishing line guide mechanism is attached to a distal end of a rotor arm. The spinning-reel fishing line guide mechanism is configured to pivot between a fishing line release guide posture and a fishing line release posture. The spinning-reel fishing line guide mechanism includes a pivot member and a communication hole. The pivot member is pivotably attached to the distal end of the rotor arm. The communication hole is formed in the outer peripheral surface of the pivot member while continuously penetrating outer and inner peripheries of the pivot member.

Generally, according to the spinning-reel fishing line guide mechanism described herein, the through hole is formed in either the first support member or the pair of the fixation shaft and the fixation shaft cover while penetrating either the first support member or the pair of the fixation shaft and the fixation shaft cover to make the inner periphery of the roller of the line roller extends toward an inner periphery of the roller from the outside. Further, the cap member is attached to or in the through hole. The cap member is herein made of a synthetic resin and includes the lubricating port to supply the lubricant therethrough. Therefore, the lubricant can be easily supplied to the inner periphery of the line roller without disassembling the first support member and/or the pair of the fixation shaft and the fixation shaft cover.

Further according to the spinning-reel fishing line guide mechanism described herein, the first lubricating port is formed in the first rotation support portion configured to be exposed to the outside while the first support member is in the fishing line release posture, while continuously penetrating the inner and outer peripheries of the first rotation support portion. Therefore, the lubricant can be easily supplied between the first support member and the first rotor arm without disassembling the first support member and the first rotor arm.

These and other objects, features, aspects, and advantages of the present invention will become apparent to those skilled in the art from the following detailed description, which, taken in conjunction with the annexed drawings, discloses an exemplary embodiments.

BRIEF DESCRIPTION OF THE DRAWINGS

Referring now to the attached drawings which form a part of this original disclosure.

DETAILED DESCRIPTION OF THE EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
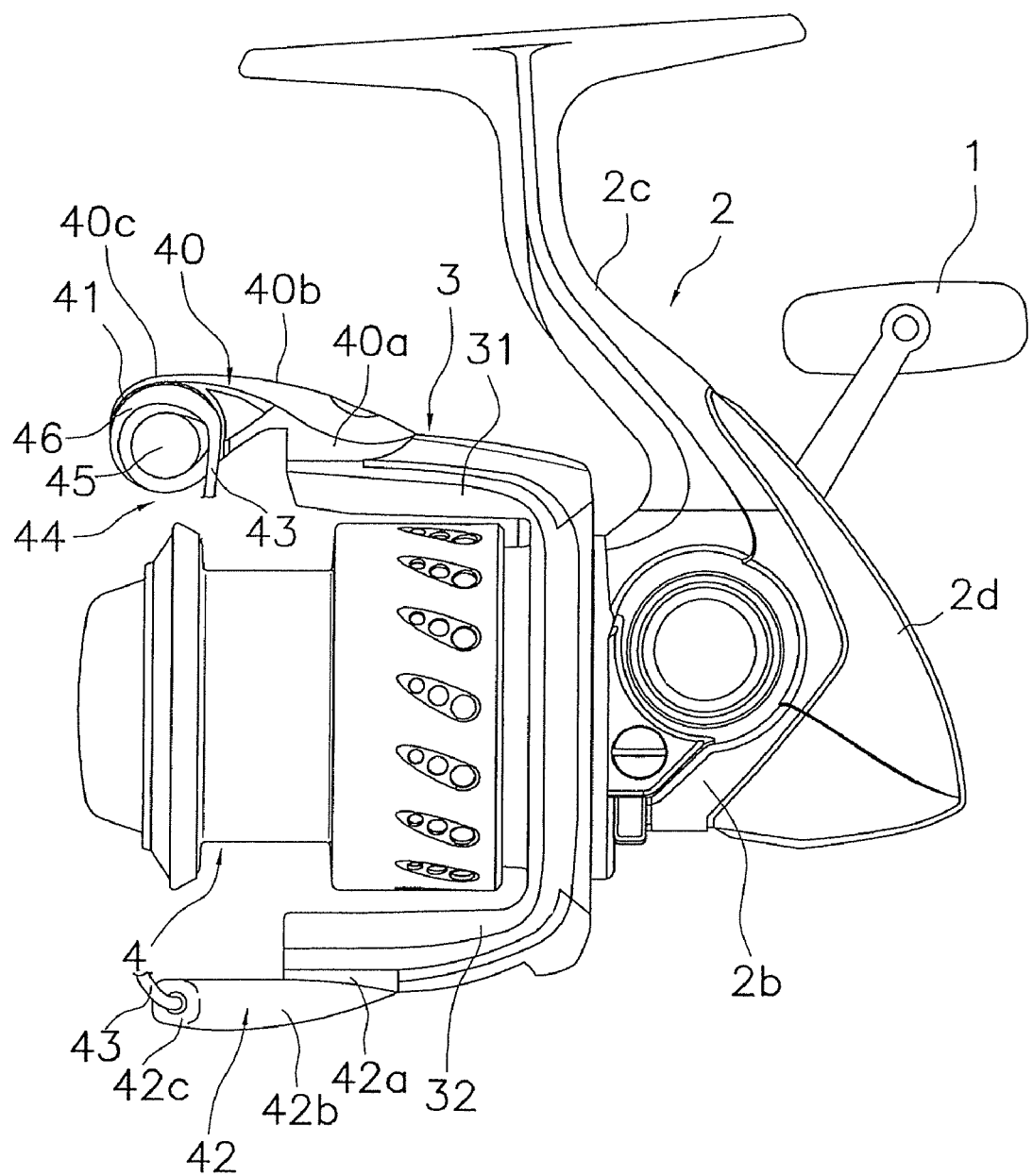
FIG. 1 is a side view of a spinning reel according to an exemplary embodiment.

As illustrated in FIG. 1, a spinning reel according to an exemplary embodiment includes a handle 1, a reel unit 2, a rotor 3, and a spool 4. The handle 1 is herein rotatably supported by the reel unit 2. The rotor 3 is rotatably supported at the front of the reel unit 2. The spool 4 is configured to wind a fishing line onto the outer peripheral surface thereof. The spool 4 is disposed at the front of the rotor 3 while being movable back and forth. It should be noted that the handle 1 is allowed to be attached to either of the right and left sides of the reel unit 2.

Figure 2:
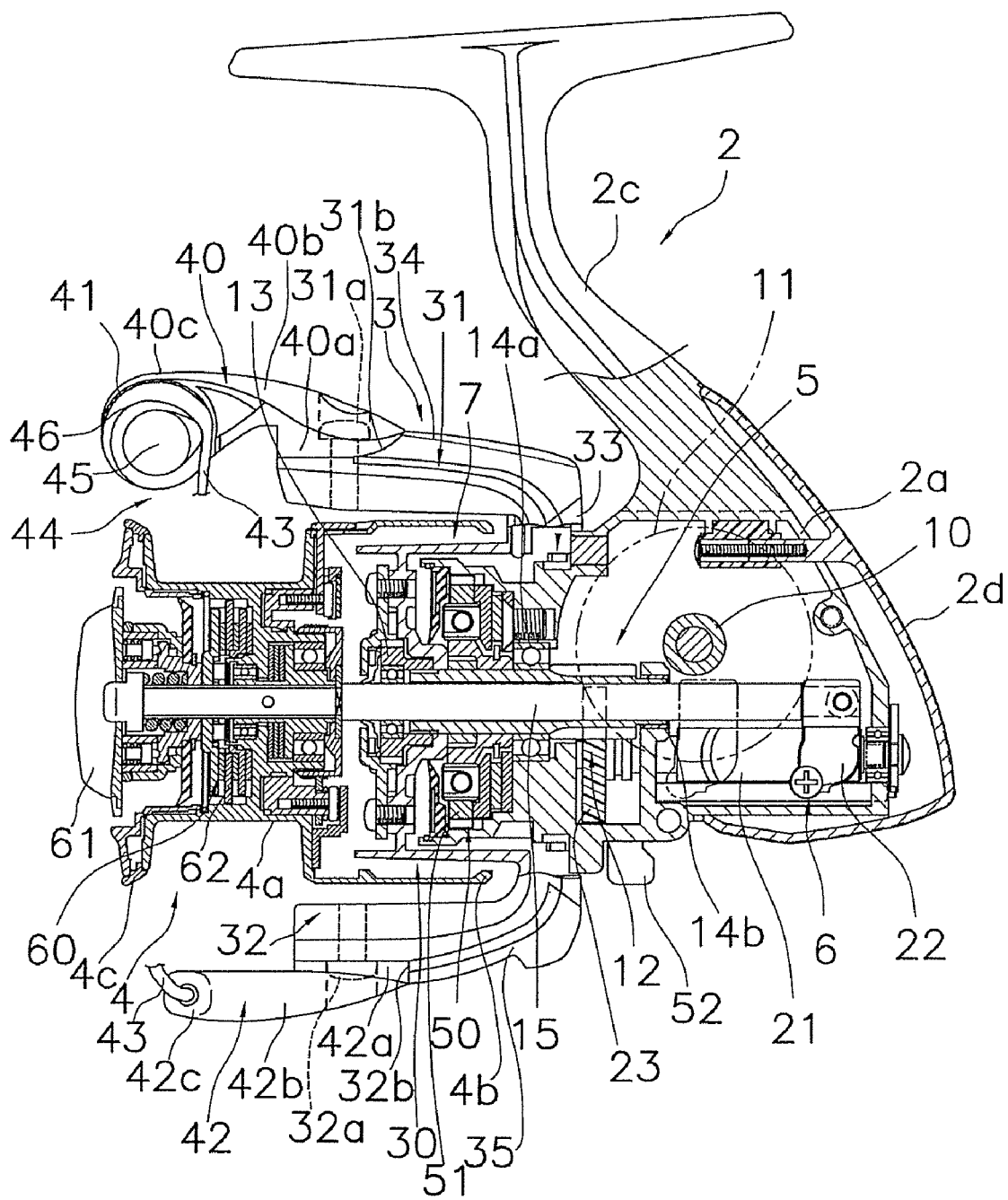
FIG. 2 is a cross-sectional side view of the spinning reel.

As illustrated in FIGS. 1 and 2, the reel unit 2 includes a reel body 2a and a lid member 2b. The reel body 2a includes an inner space. The lid member 2b is detachably attached to the reel body 2a to close the inner space of the reel body 2a. Further, the reel unit 2 includes a main body guard 2d to cover the rear part of the reel body 2a and the rear part of the lid member 2b.

The reel body 2a illustrated in FIG. 2 is made of, for instance, a light metal alloy, e.g., a magnesium alloy or an aluminum alloy. The reel body 2a includes a fishing rod attachment leg 2c. The fishing rod attachment leg 2c is a T-shaped portion that extends longitudinally. The fishing rod attachment leg 2c is integrally formed with the top of the reel body 2a. The fishing rod attachment leg 2c and the reel body 2a can form a one piece unitary member. As illustrated in FIG. 2, the reel body 2a houses a rotor driving mechanism 5 and an oscillation mechanism 6 in the inner space thereof.

The lid member 2b illustrated in FIG. 1 is made of for instance, a light metal alloy, e.g., a magnesium alloy or an aluminum alloy. For example, the front part of the lid member 2b, hidden by the rotor 3, is fixed to the reel body 2a in two positions by fixation bolts. Further, the rear part of the lid member 2b, separated away from the rotor 3, is fixed to the reel body 2a in a position by means of a fixation bolt.

As illustrated in FIG. 2, the rotor driving mechanism 5 includes a face gear 11 and a pinion gear 12. The face gear 11 is configured to rotate together with a master gear shaft 10 to which the handle 1 is fixed. The pinion gear 12 meshes with the face gear 11. The pinion gear 12 is formed in a tubular shape. The front part of the pinion gear 12 is fixed to the rotor 3 by a nut 13 while penetrating the center part of the rotor 3. Further, the pinion gear 12 is rotatably supported by the reel unit 2 through a first bearing 14a and a second bearing 14b. Specifically, the first bearing 14a supports the axial intermediate portion of the pinion gear 12, whereas the second bearing 14b supports the axial rear end portion of the pinion gear 12.

As illustrated in FIG. 2, the oscillation mechanism 6 is configured to move a spool shaft 15 coupled to the center part of the spool 4 through a drag mechanism 60 in a back-and-forth direction. The spool 4 is thereby configured to move back and forth in conjunction with the back-and-forth movement of the spool shaft 15. The oscillation mechanism 6 includes a spiral shaft 21, a slider 22, and an intermediate gear 23. The spiral shaft 21 is disposed parallel to and below the spool shaft 15. The slider 22 is configured to move back and forth along the spool shaft 21. The intermediate gear 23 is fixed to the front end of the spiral shaft 21. Further, the rear end of the spool shaft 15 is fixed to the slider 22 while being prevented from rotating. The intermediate gear 23 meshes with the pinion gear 12.

As illustrated in FIG. 2, the rotor 3 includes a rotor body 7, a first cover member 33, and a pair of a second cover member 34 and a third cover member 35. The rotor body 7 is configured to rotate about the longitudinal axis of the reel unit 2. The first cover member 33 covers the rear part of the rotor body 7. The second cover member 34 covers the outer surface of a first rotor arm 31, whereas the third cover member 35 covers the outer surface of a second rotor arm 32.

The rotor body 7 illustrated in FIG. 2 is made of, for instance, an aluminum alloy. The rotor body 7 is coupled to the pinion gear 12 while being prevented from rotating. However, the rotor body 7 is rotatable with respect to the reel unit 2. The rotor body 7 includes a tubular portion 30, the first rotor arm 31, and the second rotor arm 32. The tubular portion 30 includes a recess formed in the rear part thereof to house the front part of the reel body 2, i.e., a cylindrical portion. The first and second rotor arms 31 and 32 are connected to the rear part of the tubular portion 30 while being opposed to each other. The first and second rotor arms 31 and 32 forwardly extend while being separated from the tubular portion 30 at a predetermined interval.

As illustrated in FIG. 2, the tubular portion 30 includes a disk-shaped wall on the inner peripheral side of the front part thereof. The wall includes an annular boss in the center part thereof. The boss is coupled to the pinion gear 12 while being unitarily rotatable therewith. The front part of the pinion gear 12 is fitted into the center of the boss while being prevented from rotating. The nut 13 is screwed onto the front end of the pinion gear 12. The rotor body 7 is thereby fixed to the pinion gear 12.

The first cover member 33 is configured to cover the rear part of the rotor body 7 in the surrounding of the tubular portion 30. The second cover member 34 is configured to cover the outer side of the first rotor arm 31. The second cover member 34 is coupled to the first rotor arm 31 by a fixation bolt screwed into the first rotor arm 31.

As illustrated in FIG. 2, the second cover member 34 is joined to the first cover member 33 and the first rotor arm 31 to form a three-dimensional curved surface. The second cover member 34 includes a distal end roughly semi-circularly cut out to dispose therein a first bail support member 40 described below, which is an example of a first support member.

As illustrated in FIG. 2, the third cover member 35 is configured to cover the outer side of the second rotor arm 32. The third cover member 35 is fixed to the second rotor arm 32 by a fixation bolt and a nut member screwed onto the fixation bolt. Similarly to the second cover member 34, the third cover member 35 is also jointed to the first cover member 33 and the second rotor arm 32 to form a three-dimensional curved surface. The fixation bolt has not only a function of fixing the third cover member 35 to the rotor body 7 but also a function of supporting a second bail support member 42 described below, which is an example of a second support member, while allowing the second bail support member 42 to pivot.

As illustrated in FIG. 2, the first bail support member 40 is pivotably attached to the outer peripheral side of the distal end of the first rotor arm 31 by a pin member 31a. The distal end of the first rotor arm 31 includes or is a step portion 31b. Further, a line roller 41 is attached to the distal end of the first bail support member 40 to guide the fishing line onto the spool 4. On the other hand, the second bail support member 42 is pivotably attached to the outer peripheral side of the distal end of the second rotor arm 32 by a second pin member 32a. The distal end of the second rotor arm 32 includes or is a second step portion 32b. Further, a bail 43 is fixed between the line roller 41 and the second bail support member 42. The bail 43 is formed by curving a wire rod in a roughly U-shape. The first bail support member 40, the second bail support member 42, the line roller 41, and the bail 43 form a bail arm 44 (an example of a fishing line guide mechanism) configured to guide the fishing line onto the spool 4. The bail arm 44 is configured to pivot between a fishing line guide posture illustrated in FIG. 2 and a fishing line release posture flipped from the fishing line guide posture.

As illustrated in FIGS. 1 and 2, the bail arm 44 is attached to the distal end of the first rotor arm 31 and the distal end of the second rotor arm 32 while being pivotable between the fishing line guide posture and the fishing line release posture. The bail arm 44 includes the first bail support member 40 and the second bail support member 42. The first bail support member 40 is pivotably attached to the distal end of the first rotor arm 31, whereas the second bail support member 42 is pivotably attached to the distal end of the second rotor arm 32.

The first bail support member 40 is pivotably attached to the outer side of the first rotor arm 31, whereas the second bail support member 42 is pivotably attached to the outer side of the second rotor arm 32. As illustrated in FIGS. 1 and 2, the bail arm 44 includes the bail 43, a fixation shaft 45, the line roller 41, and a fixation shaft cover 46. The bail 43 couples the first bail support member 40 and the second bail support member 42. The distal end of the fixation shaft 45 is fixed to the first bail support member 40. The line roller 41 is supported by the fixation shaft 45. The fixation shaft cover 46 covers the fixation shaft 45.

Figure 3:
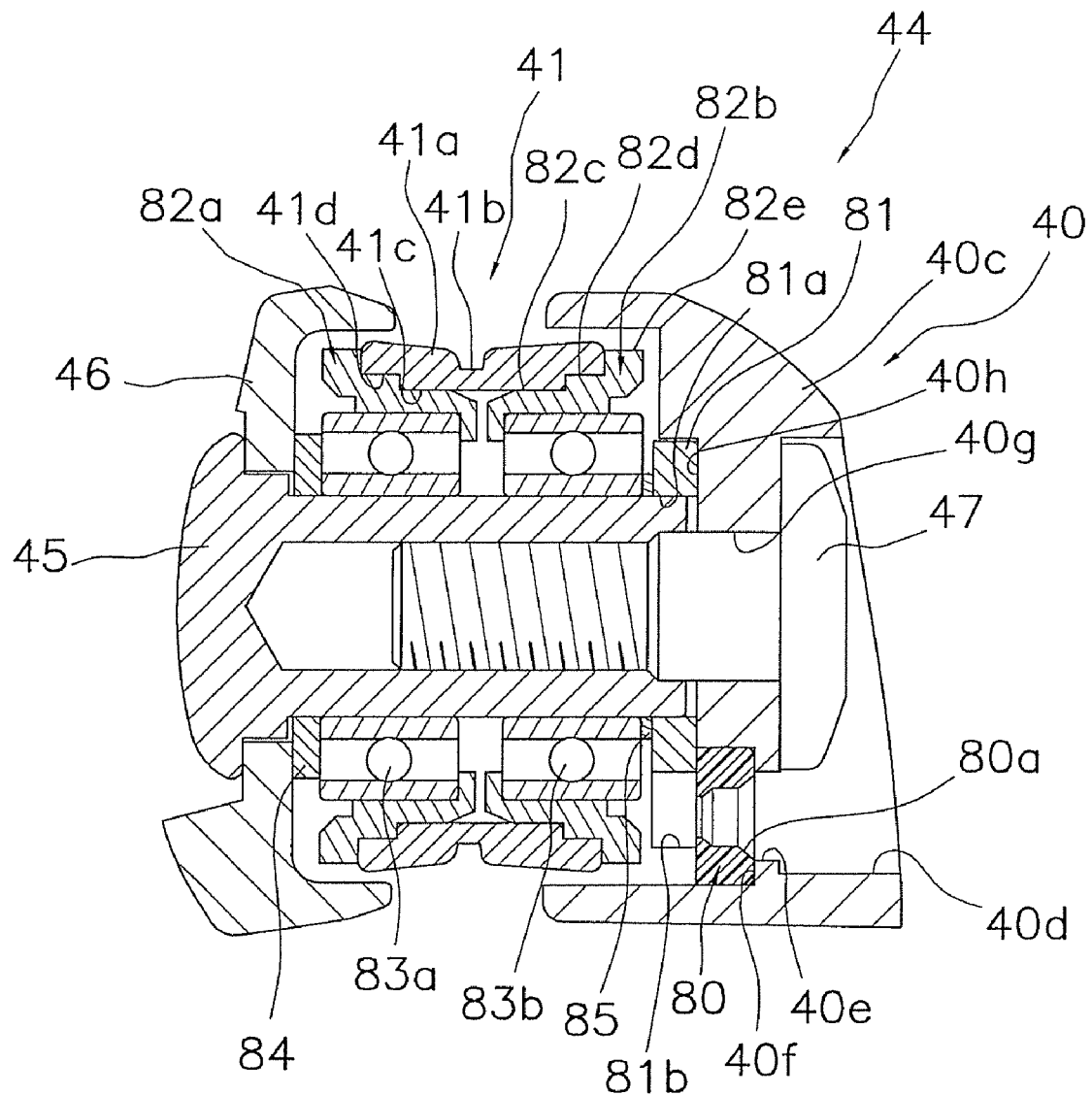
FIG. 3 is an enlarged cross-sectional view of a first bail support member and a surrounding section thereof in the spinning reel.
Figure 4:
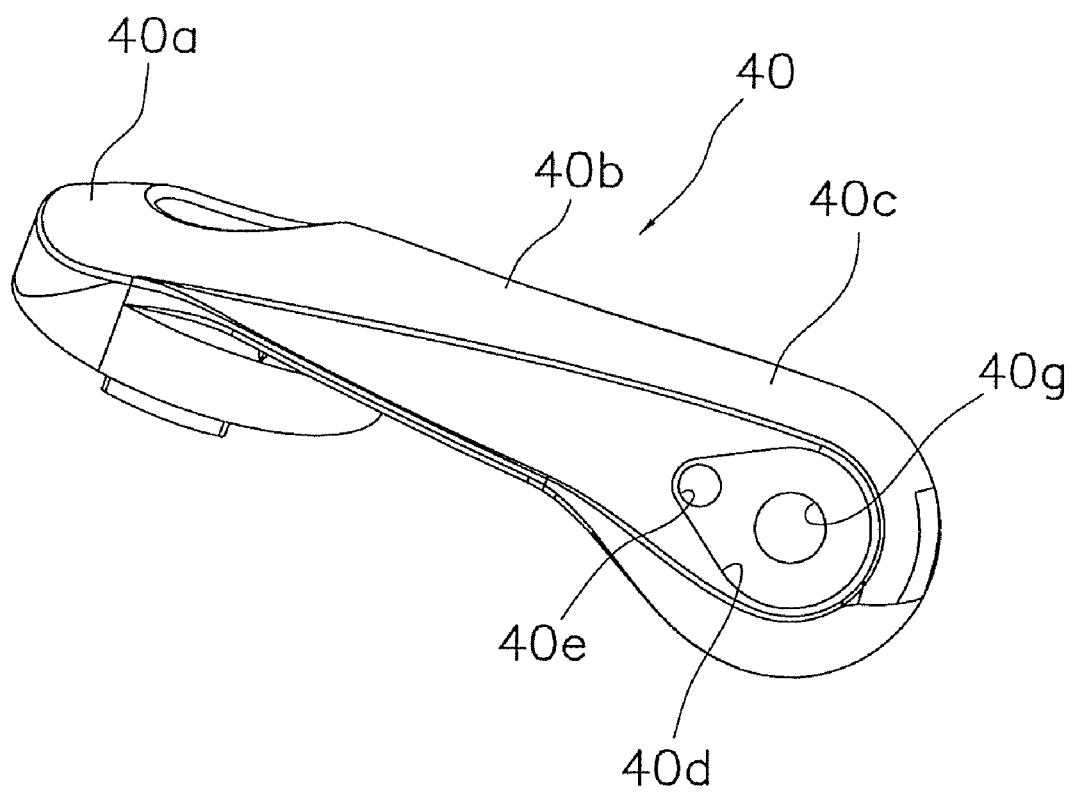
FIG. 4 is an oblique view of the first bail support member seen from outside.
Figure 5:
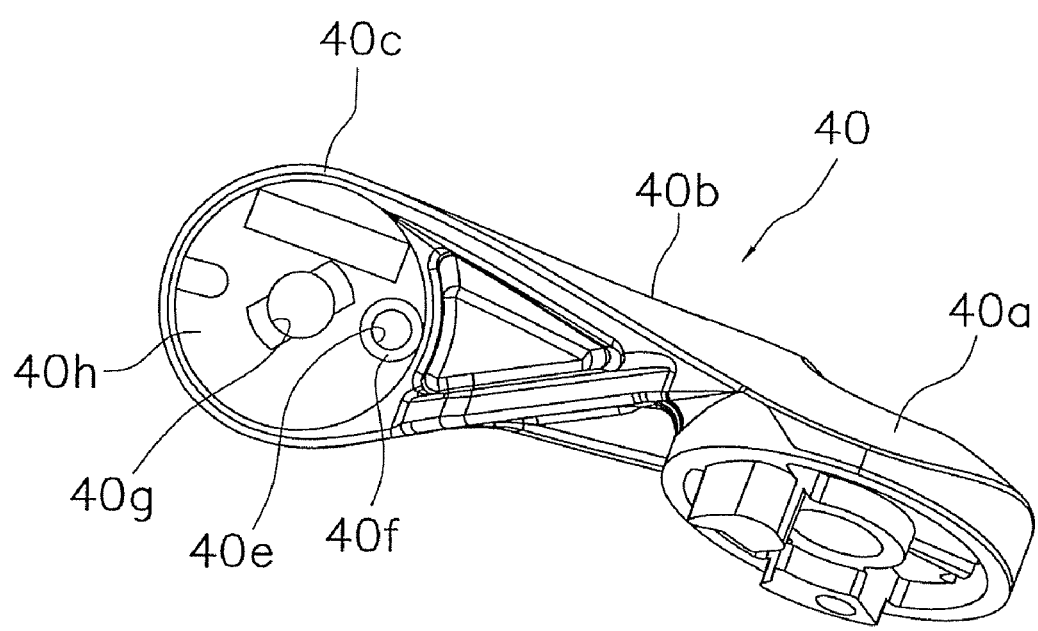
FIG. 5 is an oblique view of the first bail support member shown from the inside.
Figure 10:
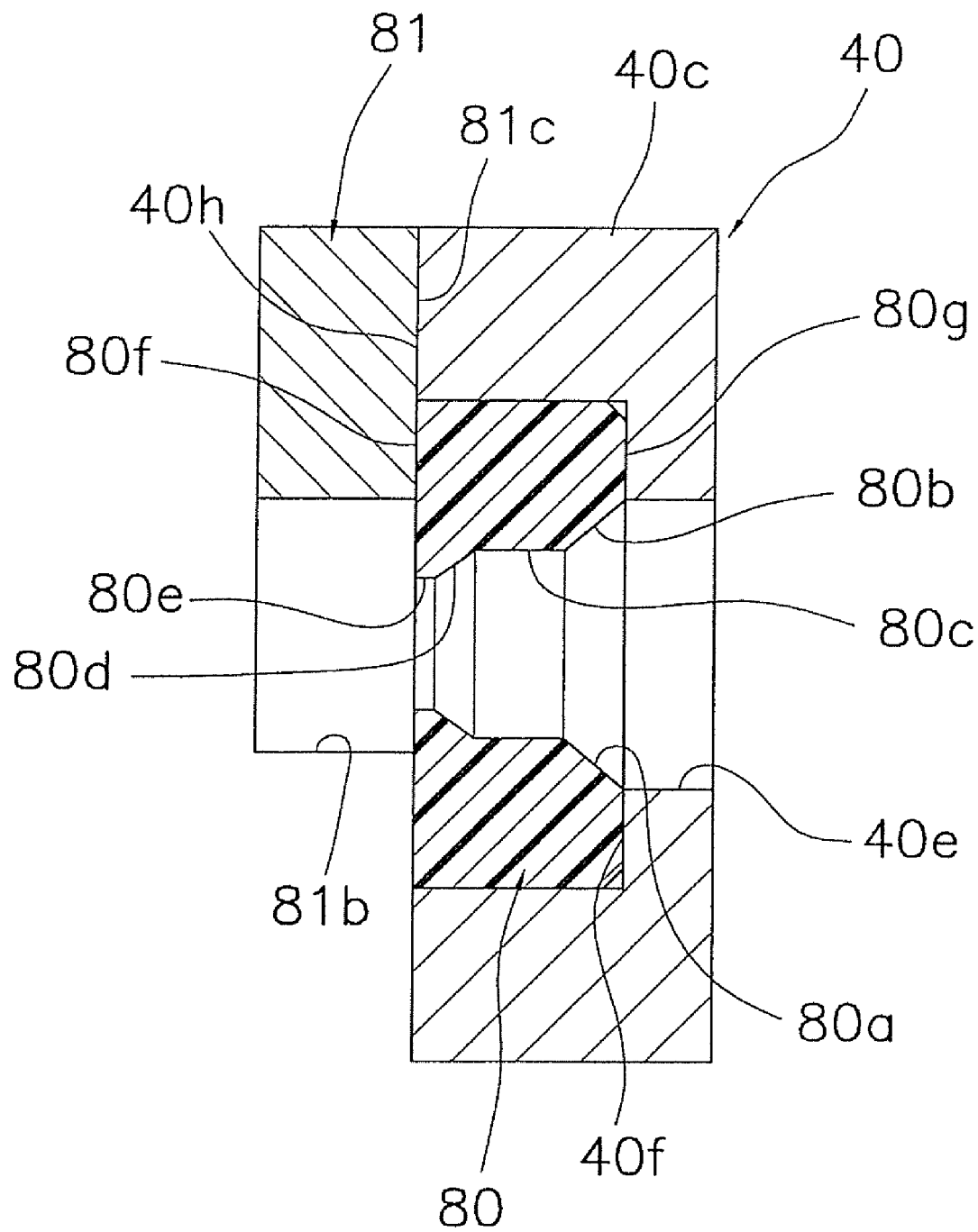
FIG. 10 is an enlarged cross-sectional view of the cap member and a surrounding section thereof.

The first bail support member 40 is pivotably attached to the distal end of the first rotor arm 31. As illustrated in FIGS. 2, 4, and 5, the first bail support member 40 includes a first rotation support portion 40a, a first arm portion 40b, and a first attachment portion 40c. The first rotation support portion 40a is pivotably attached to the first rotor arm 31. The first arm portion 40b forwardly extends from the first rotation support portion 40a. The first attachment portion 40c is integrally formed with the distal end of the first arm portion 40b. The first attachment portion 40c can be formed with the distal end of the first arm portion 40b as a one piece unitary member. The first attachment portion 40c allows the line roller 41 of the bail arm 44, the fixation shaft 45, and the fixation shaft cover 46 to be attached thereto. As illustrated in FIGS. 3 to 5, the first attachment portion 40c includes a recess 40d, a through hole 40g, and a through hole 40e. The recess 40d is recessed inwardly, i.e., to the leftward in FIG. 3, and includes a portion formed in a roughly raindrop shape. In other words, the recess 40d has round or circular shape on the end opposite the first rotation support portion 40a that tapers in a direction toward the first rotation support portion 40a. The roughly raindrop shaped portion surrounds a portion for attaching a fixation bolt 47 (see FIG. 3) thereto. The fixation bolt 47 is screwed into the fixation shaft 45. The through hole 40g is formed in the roughly large circular base end of the roughly raindrop shaped portion of the recess 40d. The through hole 40g allows the fixation bolt 47 to be inserted therein. The through hole 40e is formed in a roughly small circular or tapered tip of the roughly raindrop shaped portion of the recess 40d. The through hole 40e is formed to attach a cap member 80 to the first attachment portion 40c from the inner side of the first bail support member 4. As illustrated in FIGS. 3 and 10, the through hole 40e is used for attachment of the cap member 80 and is disposed in the vicinity of the through hole 40g used for attachment of the fixation bolt 47. Under a condition in which the fixation bolt 47 is attached to the through hole 40g, the through hole 40e penetrates the first attachment portion 40c to make the inner periphery of a roller 41a of the line roller 41 extends toward the inner periphery of the roller 41a from the outside of the first bail support member 40. The through hole 40e includes a stepped portion 40f that protrudes in a radial inward direction, i.e., perpendicular or substantially perpendicular to the direction in which the through hole 40e extends. When the cap member 80 is attached to the first attachment portion 40c from the inner side of the first bail support member 40, an outer surface 80g (see FIG. 10) of the cap member 80 abuts the stepped portion 40f. The cap member 80 is thereby appropriately positioned while being prevented from protruding to the outside of the first bail support member 40.

As illustrated in FIGS. 3, 7, 8, and 10, the cap member 80 is a roughly cylindrical member made of a synthetic resin. The cap member 80 is attached to the through hole 40e of the first bail support member 40 from the inner side of the first bail support member 40. The cap member 80 includes a lubricating port 80a in the center part thereof. The lubricating port 80a is a narrow through hole formed to supply a lubricant, e.g., lubricating oil, onto or into the inner periphery of the line roller 41. The cap member 80 is made of, for instance, a synthetic rubber such as a nitrile butadiene rubber (NBR). The lubricating port 80a is a through hole having a diameter that is relatively small but large enough to allow insertion of a lubricating nozzle. As illustrated in FIG. 10, the lubricating port 80a includes a first slanted portion 80b, a first tubular portion 80c, a second slanted portion 80d, and a second tubular portion 80e. The first slanted portion 80b has a diameter that gradually reduces from the outer side, i.e., the right side in FIG. 10, of the first bail support member 40 to the inner side, i.e., the left side in FIG. 10, of the first bail support member 40. In other words, the first slanted portion 80b slants toward the center of the through hole in a direction toward the retaining member 81. The first tubular portion 80c extends from a minimum diameter part of the first slanted portion 80b to the inner side, i.e., the left side in FIG. 10, of the first bail support member 40, and has a constant or substantially constant diameter. The first tubular portion 80c has a diameter equal to the diameter of the minimum diameter part of the first slanted portion 80b. The second slanted portion 80d has a diameter that gradually reduces from the first tubular portion 80c to the inner side, i.e., the left side in FIG. 10, of the first bail support member 40. In other words, the second slanted portion 80d slants toward the center of the through hole in a direction toward the retaining member 81. The second tubular portion 80e extends from a minimum diameter part of the second slanted portion 80d to the inner side, i.e., the left side in FIG. 10, of the first bail support member 40, and has a constant or substantially constant diameter. The second tubular portion 80e has a diameter equal to the diameter of the minimum diameter part of the second slanted portion 80d. A maximum diameter part of the first slanted portion 80b has a diameter roughly equal or equal to the inner diameter of the stepped portion 40f of the through hole 40e. The maximum diameter part of the first slanted portion 80b is arranged to prevent the outer surface 80g of the cap member 80 from being exposed to the outside of the first bail support member 40. The second tubular portion 80e has a diameter that is relatively small but large enough to allow insertion of the lubricating nozzle. The diameter of the lubricating port 80a can vary, with the diameter of the first tubular portion 80c being equal to the minimum diameter of the first slanted portion 80b. Further, the maximum diameter of the second slanted portion 80d is equal to the diameter of the first tubular portion 80c. Moreover, the second tubular portion 80e is equal to the minimum diameter of the second slanted portion 80d. For example, the diameter of the lubricating port 80a can range from 0.5 mm to 2.0 mm. In this embodiment, as illustrated in FIG. 10, the maximum diameter of the first slanted portion 80b is 1.5 mm. The minimum diameter of the first slanted portion 80b is 1.0 mm. The diameter of the first tubular portion 80c is 1.0 mm. The maximum diameter of the second slanted portion 80d is 1.0 mm. The minimum diameter of the second slanted portion 80d is 0.7 mm. The diameter of the second tubular portion 80e is 0.7 mm. Further, a plate-shape retainer member 81 is pressed and attached to the first attachment portion 40c from the inner side of the first bail support member 40 to abut an inner surface 80f (see FIG. 10) of the cap member 80. The cap member 80 is thereby fixed to the first bail support member 40.

Figure 6:
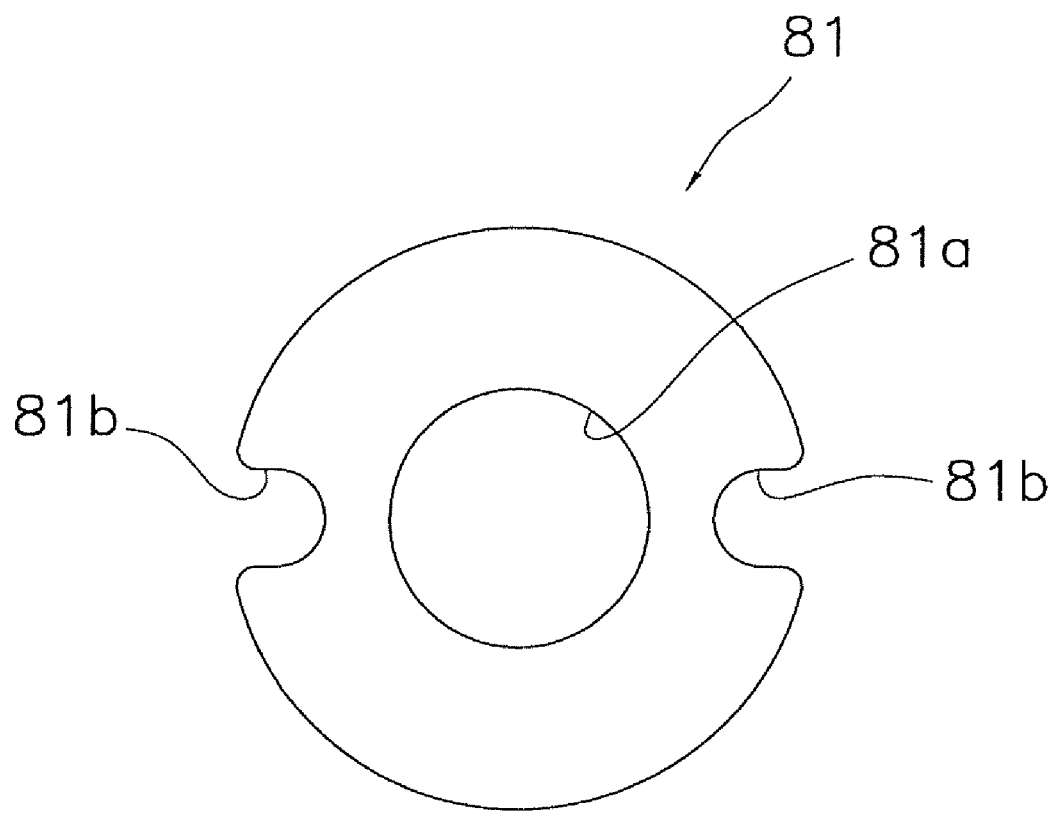
FIG. 6 is an enlarged front view of a retainer member of the first bail member.
Figure 7:
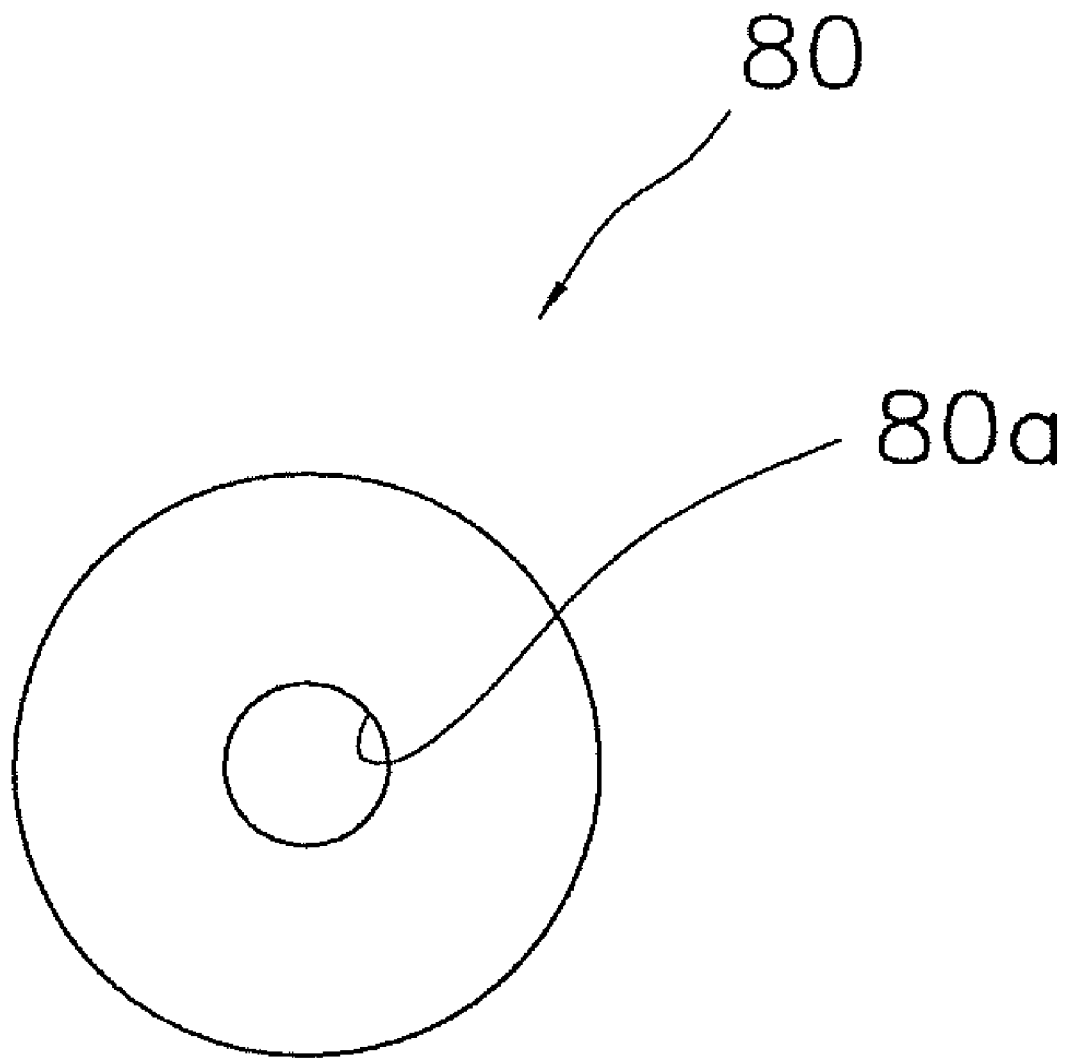
FIG. 7 is an enlarged front view of a cap member of the first bail member.
Figure 8:
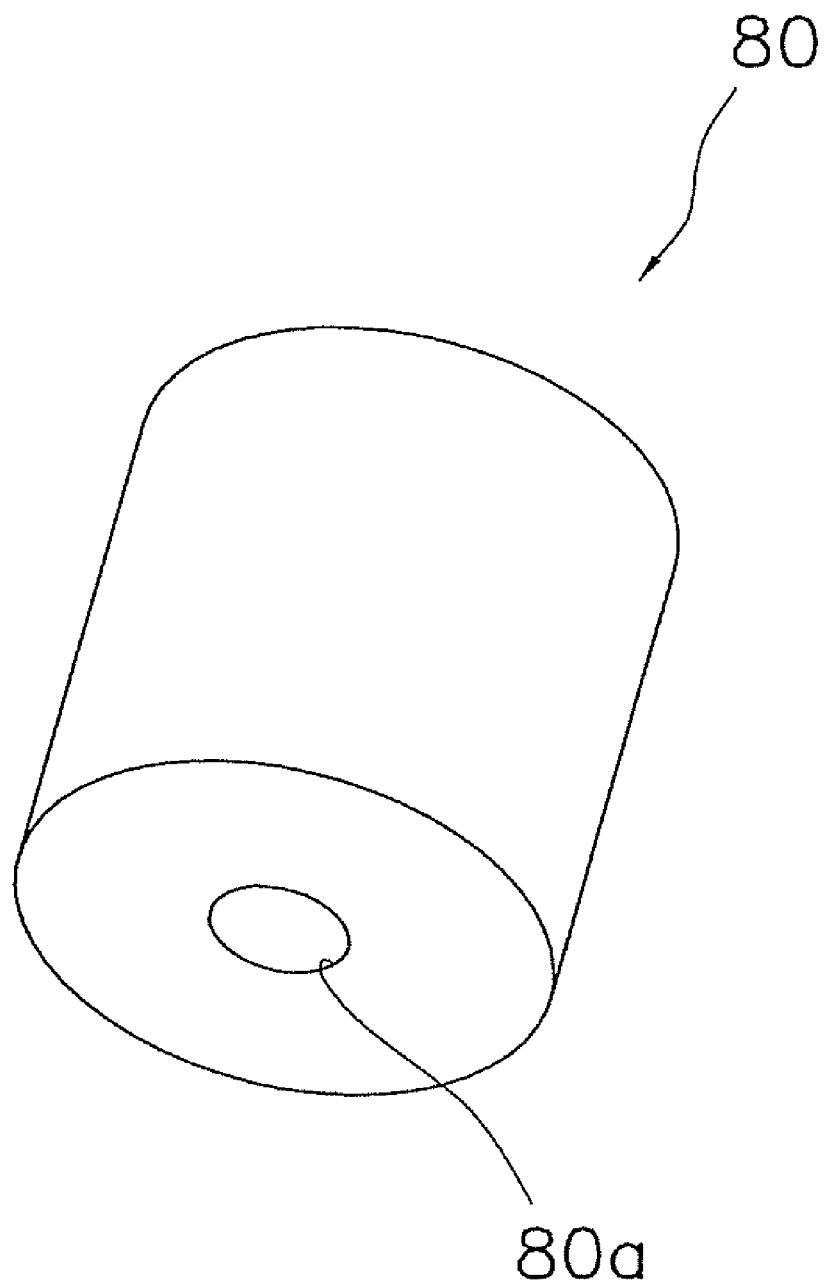
FIG. 8 is an enlarged oblique view of the cap member.

As illustrated in FIGS. 3, 6, and 10, the retainer member 81 includes a through hole 81a and two cutout portions 81b. The through hole 81a is formed in the center part of the retainer member 81. The through hole 81a communicates with the through hole 40g of the first bail support member 40 where the fixation bolt 47 is attached. The cutout portions 81b are formed by partially cutting the outer periphery of the retainer member 81 at circumferentially opposite positions. One of the cutout portions 81b communicates with the through hole 40e of the first bail support member 40 and the lubricating port 80a of the cap member 80. The retainer member 81 is attached to the first attachment portion 40c under a condition in which an outer surface 81c thereof abuts a roughly circular inner surface 40h of the first bail support member 40. Simultaneously, the outer surface 81c of the retainer member 81 outwardly presses the inner surface 80f of the cap member 80. The outer surface 80g of the cap member 80 thereby abuts the stepped portion 40f of the through hole 40e. Consequently, the cap member 80 is fixed to the first bail support member 40. The lubricant is herein configured to be supplied to the inner periphery of the line roller 41 through the outwardly exposed lubricating port 80a of the cap member 80.

Figure 13:
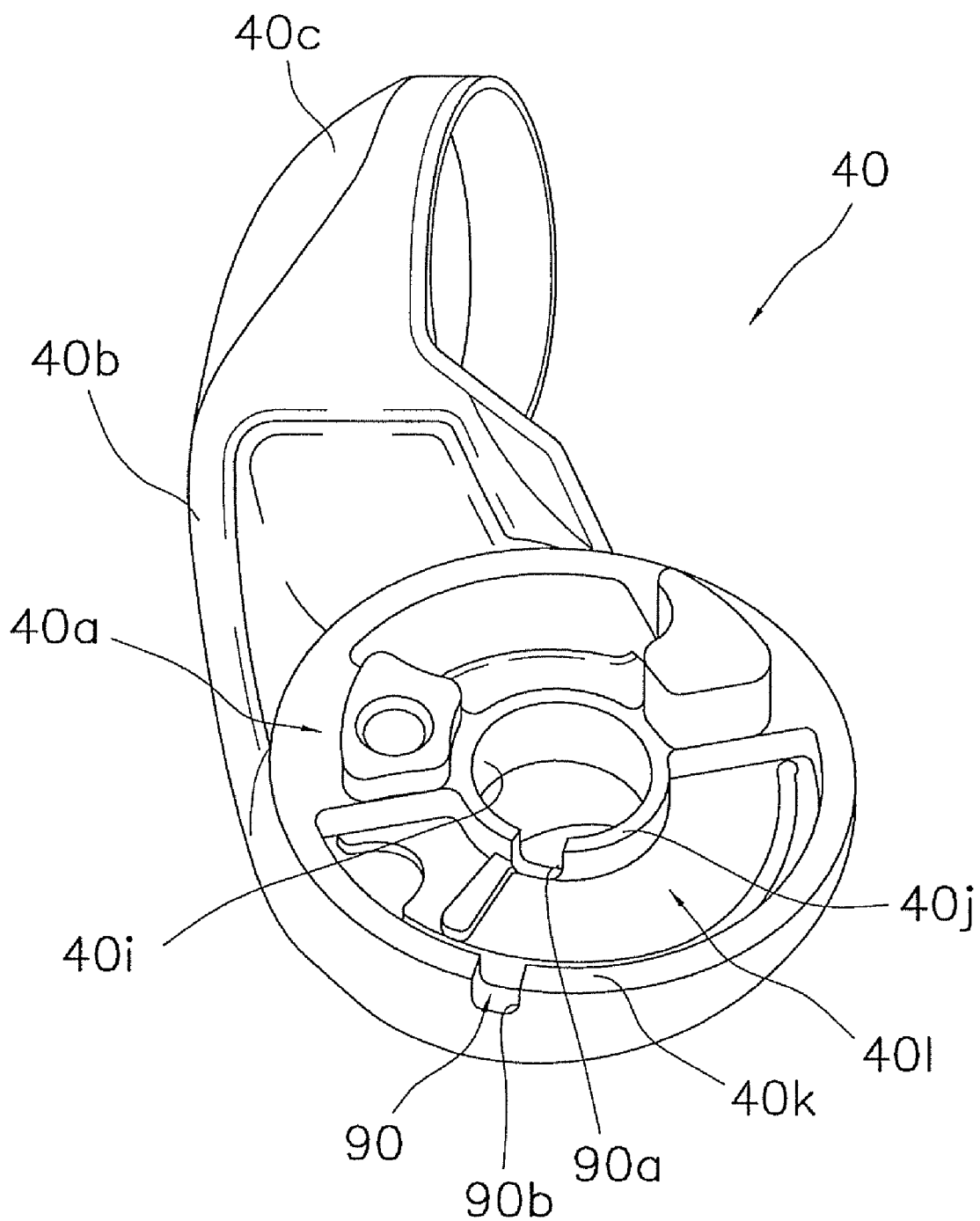
FIG. 13 is an oblique view of a first bail support member of the spinning reel.
Figure 15A:
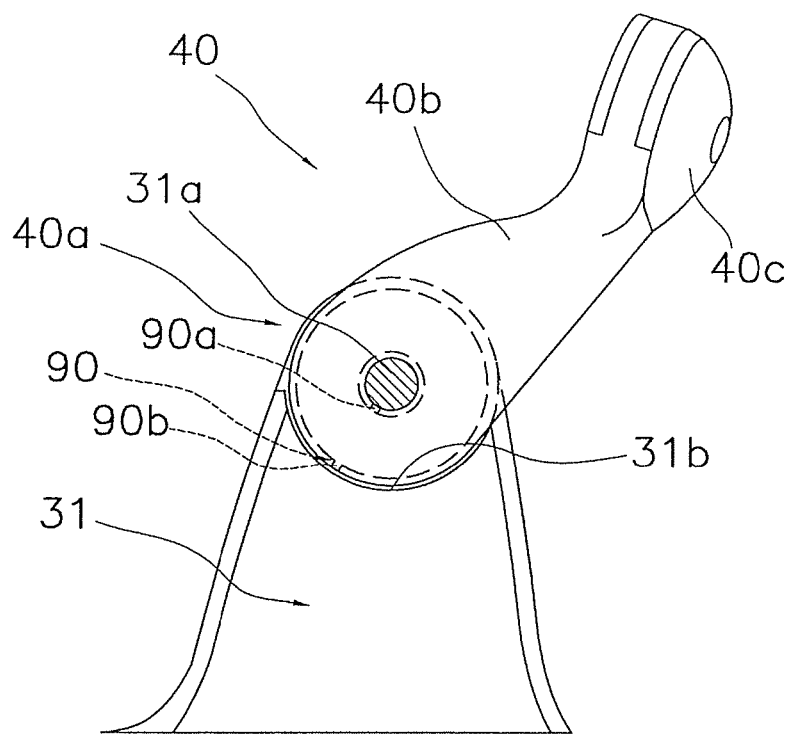
FIG. 15A is a perspective view of the first bail support member and a first rotor arm 31 from the outer periphery side when in the fishing line guide posture.
Figure 15B:
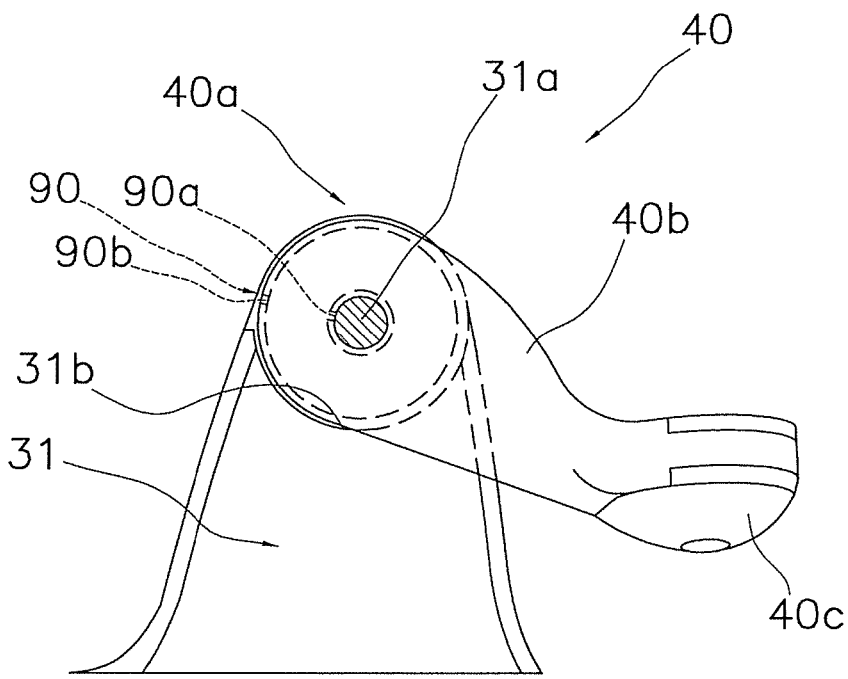
FIG. 15B is a perspective view of the first bail support member and the first rotor arm 31 from the outer periphery side when in the fishing line release posture.

As illustrated in FIGS. 13, 15A, 15B, the first rotation support portion 40a is an annular portion including a through hole 40i in the center part thereof. The pin member 31a is herein inserted into the through hole 40*i* for rotational support of the first rotation support portion 40*a*. Thus, a line extending in the center or the substantial center of the pin member 31*a* and the through hole 40*i* represents the axis of rotation for the first bail support member 40. The first rotation support portion 40*a* includes an inner flanged portion 40*j*, an outer flanged portion 40*k*, and a hollow portion 40*l*. The inner flanged portion 40*j* is a protruded portion formed in an inner periphery of the first rotation support portion 40*a*. The inner flanged portion 40*j* protrudes in a first direction parallel or substantially parallel to the axis of rotation of the first bail support member 40. The outer flanged portion 40*k* is a protruded portion formed in an outer periphery of the first rotation support portion 40*a*, and also protrudes or substantially protrudes in the first direction. The hollow portion 40*l* is formed between the inner flanged portion 40*j* and the outer flanged portion 40*k*. A portion of the first rotation support portion 40*a* is configured to be exposed to the outside when the first bail support member 40 is positioned in the fishing line release posture. The first rotation support portion 40*a* includes a first lubricating port 90. The first lubricating port 90 continuously penetrates the inner and outer peripheries of the first rotation support portion 40*a*.

The first lubricating port 90 is a narrow lubricating port to supply the lubricant between the first bail support member 40 and the first rotor arm 31. The first lubricating port 90 is a through hole having a diameter that is relatively small but large enough to allow insertion of a lubricating nozzle. The first lubricating port 90 is formed in the first rotation support portion 40*a* configured not to be exposed to the outside in the fishing line guide posture. The first lubricating port 90 is configured to be exposed to the outside when the first bail support member 40 is positioned in the fishing line release posture. On the other hand, the first lubricating port 90 is configured not to be exposed to the outside when the first bail support member 40 is positioned in the fishing line guide posture. The first lubricating port 90 can be covered by a portion of the first rotor arm 31 when the first bail support member 40 is positioned in the fishing line guide posture. When the first bail support member 40 is rotated on its axis to the fishing line release posture the first lubricating port 90 is exposed. The first lubricating port 90 is a through hole having a diameter that is relatively small but large enough to allow insertion of the lubricating nozzle. As illustrated in FIG. 13, the first lubricating port 90 includes a first through hole 90*a* and a second through hole 90*b*. For example, the diameter of the first lubricating port 90 can range from 0.5 mm to 2.0 mm, excepting the hollow portion 40*l*. Further, the diameters of through holes 90*a* and 90*b* can be equal or substantially equal. In this embodiment, as illustrated in FIG. 13, the diameter of the first through hole 90*a* is 1.5 mm. The diameter of the second through hole 90*b* is 1.5 mm. As seen in FIG. 13, the first and second through holes 90*a* and 90*b* are recesses formed in the first bail support member 40 that become through holes when the first bail support member 40 is attached to the first rotor arm 31. The first through hole 90*a* is formed in the inner flanged portion 40*j*. The second through hole 90*b* is formed in the outer flanged portion 40*k* while communicating with the hollow portion 40*l* and the first through hole 90*a*. Thus, the alignment of the first and second through holes 90*a* and 90*b* is not parallel to the first direction, and is preferably perpendicular or substantially perpendicular to the first direction, and more preferably intersects and is perpendicular or substantially perpendicular to the axis of rotation of the first bail support member 40. When the lubricant is herein supplied between the first bail support member 40 and the first rotor arm 31, the first bail support member 40 is pivoted to the fishing line release posture. The first lubricating port 90 is accordingly exposed to the outside. The lubricant is supplied to the inner periphery of the first rotation support portion 40*a* through the exposed first lubricating port 90. Specifically, the first bail support member 40 is pivoted to the fishing line release posture, the second through hole 90*b* is accordingly exposed to the outside. The lubricant is supplied into the first through hole 90*a*, formed in the inner periphery, from the exposed second through hole 90*b* through the hollow portion 40*l*.

FIG. 15A shows the fishing line guide posture. The second through hole 90*b* of the first lubricating port 90 is covered by the first step portion 31*b* of the first rotor arm 31 so the second through hole 90*b* of the first lubricating port 90 is not exposed to outside in the fishing line guide posture. FIG. 15B shows the fishing line release posture that the first bail support member 40 is pivoted. Thus, the second through hole 90*b* of the first lubricating port 90 is exposed to outside in the fishing line release posture.

Figure 9:
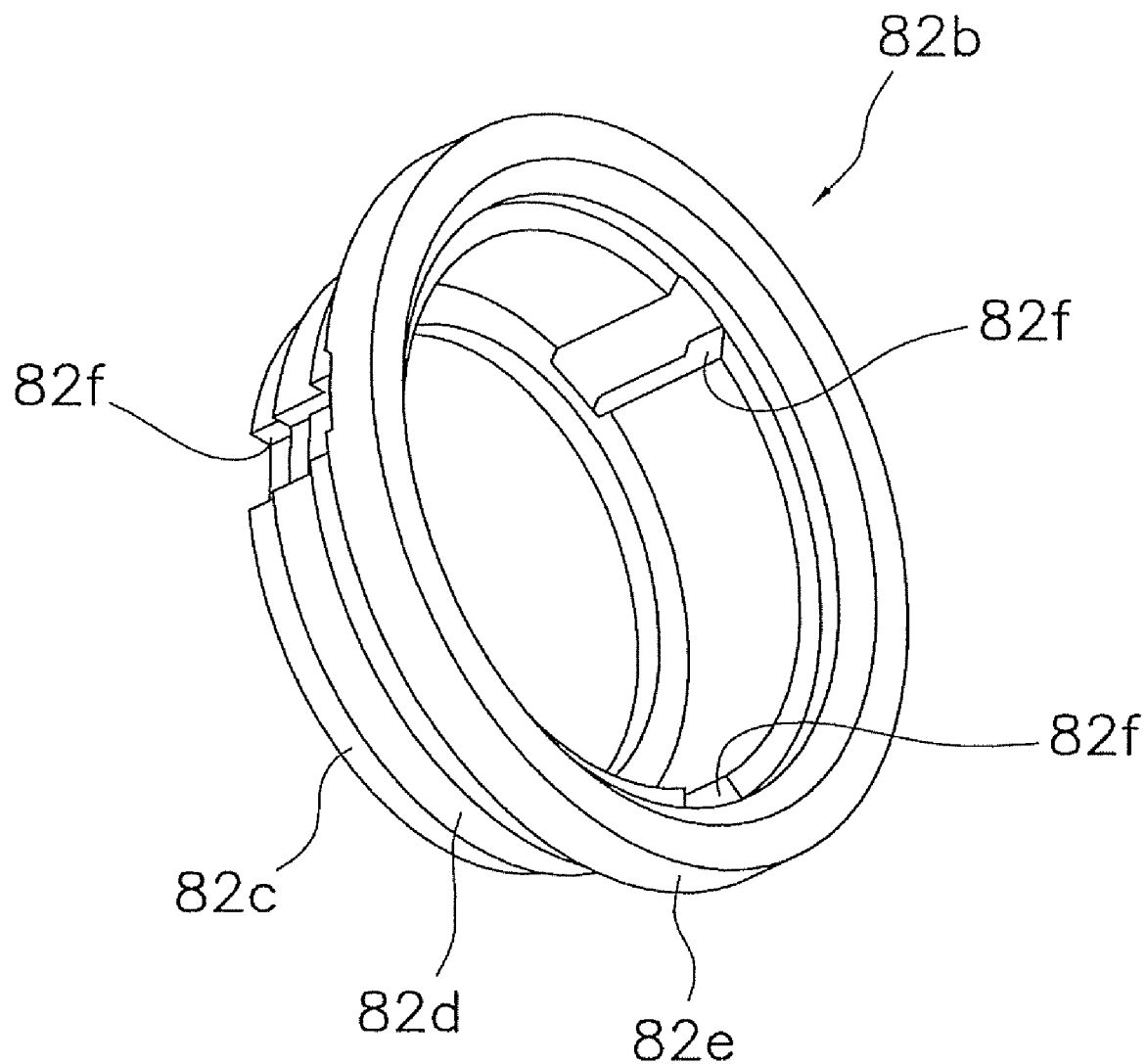
FIG. 9 is an enlarged oblique view of a tubular member of the first bail support member.

Referring now to FIGS. 2 and 3, the line roller 41 is a member disposed in or on the distal end of the first bail support member 40 to guide the fishing line onto the spool 4. As illustrated in FIG. 3, the line roller 41 includes the tubular roller 41*a*, a first tubular member 82*a*, a second tubular member 82*b*, a first bearing 83*a*, and a second bearing 83*b*. The roller 41*a* includes a groove on the outer peripheral surface thereof to guide the fishing line. The first tubular member 82*a* and the second tubular member 82*b* are disposed on the inner peripheral side of the roller 41*a* while being axially separated by a predetermined interval. The first bearing 83*a* is disposed on the inner peripheral side of the first tubular member 82*a*, whereas the second bearing 83*b* is disposed on the inner peripheral side of the second tubular member 82*b*. Further, the first bearing 83*a* and the second bearing 83*b* are disposed on the outer peripheral side of the fixation shaft 45. The first bearing 83*a* and the second bearing 83*b* are axially separated by a predetermined interval. The roller 41*a* is rotatably supported by the fixation shaft 45 through a pair of the first tubular member 82*a* and the first bearing 83*a*, and a pair of the second tubular member 82*b* and the second bearing 83*b*. The roller 41*a* includes a guide portion 41*b*, a small inner diameter portion 41*c*, and a pair of large inner diameter portions 41*d*. The guide portion 41*b* includes a groove on the outer periphery thereof to guide the fishing line. The small inner diameter portion 41*c* is formed in the axial inner part of the inner periphery of the roller 41*a* while having a small inner diameter. The pair of the large inner diameter portions 41*d* is formed in the axial outer parts, i.e., both axial ends of the inner periphery of the roller 41*a* while having a large diameter. As illustrated in FIGS. 3 and 9, each of the first and second tubular members 82*a* and 82*b* is a stepped tubular member made of a synthetic resin. The first and second tubular members 82*a* and 82*b* are formed to have an identical or substantially identical shape. As illustrated in FIG. 3, the first and second tubular members 82*a* and 82*b* are transversely disposed in a symmetrical fashion. Further, the first tubular member 82*a* is an individual spacer interposed between the inner periphery of the roller 41*a* of the line roller 41 and the outer periphery of the first bearing 83*a*. Similarly, the second tubular member 82*b* is an individual spacer interposed between the inner periphery of the roller 41*a* of the line roller 41 and the outer periphery of the second bearing 83*b*. The first and second tubular members 82*a* and 82*b* are configured to support the roller 41*a* of the line roller 41 while appropriately positioning the roller 41*a*. As illustrated in FIG. 3, each of the first and second tubular members 82*a* and 82*b* includes a first tubular portion 82*c*, a second tubular portion 82*d*, and a flanged portion 82e. The first tubular portion 82c supports the small inner diameter portion 41c of the roller 41a. The second tubular portion 82d supports the large inner diameter portion 41d of the roller 41a. The second tubular portion 82d has a diameter greater than that of the first tubular portion 82c. The flanged portion 82e laterally supports either of the axial ends of the roller 41a. The flanged portion 82e has a diameter greater than that of the second tubular portion 82d. As illustrated in FIG. 9, each of the second tubular member 82b and the first tubular member 82a further includes three cutout portions 82f. The cutout portions 82f are formed by cutting out the lateral parts of the first and second tubular portions 82c, 82d while being separated at predetermined intervals. It should be herein noted that FIG. 9 illustrates only the second tubular member 82b but the first tubular member 82a also has a structure identical or substantially identical to that of the second tubular member 82b. The cutout portions 82f penetrate the lateral parts of the first and second tubular portions 82c, 82d to communicate with the lubricating port 80a of the cap member 80 and the inner periphery of the roller 41a of the line roller 41. The lubricant can be herein easily supplied to the inner periphery of the line roller 41 by the structure such that the cutout portions 82f are formed in each of the first and second tubular members 82a and 82b to communicate with the lubricating port 80a of the cap member 80 and the inner periphery of the roller 41a of the line roller 41.

Referring now to FIGS. 1 and 2, the bail 43 is a wire member coupling the fixation shaft cover 46 and the second bail support member 42 to lead the fishing line onto the line roller 41. As illustrated in FIGS. 1 and 2, one end of the bail 43 is integrally molded with the fixation shaft cover 46 by forging of a stainless alloy, whereas the other end of the bail 43 is fixed to the second bail support member 42 by caulking. The bail 43 is disposed on the outside of the outer periphery of the spool 4 while being convexly curved. The bail 43 is configured to lead the fishing line onto the line roller 41 through the fixation shaft cover 46 when the bail arm 44 is returned to the fishing line guide posture from the fishing line release posture.

The second bail support member 42 is pivotably attached to the distal end of the second rotor arm 32. The second bail support member 42 is an arm member made of, e.g., a zinc alloy. The second bail support member 42 supports the end of the bail 43. As illustrated in FIG. 2, the second bail support member 42 includes a second rotation support portion 42a, a second arm portion 42b, and a second attachment portion 42c. The second rotation support portion 42a is pivotably attached to the second rotor arm 32. The second arm portion 42b forwardly extends from the second rotation support portion 42a. The second attachment portion 42c is integrally formed with an end of the second arm portion 42b. The second attachment portion 42c allows the bail 43 of the bail arm 44 to be attached thereto.

Figure 14:
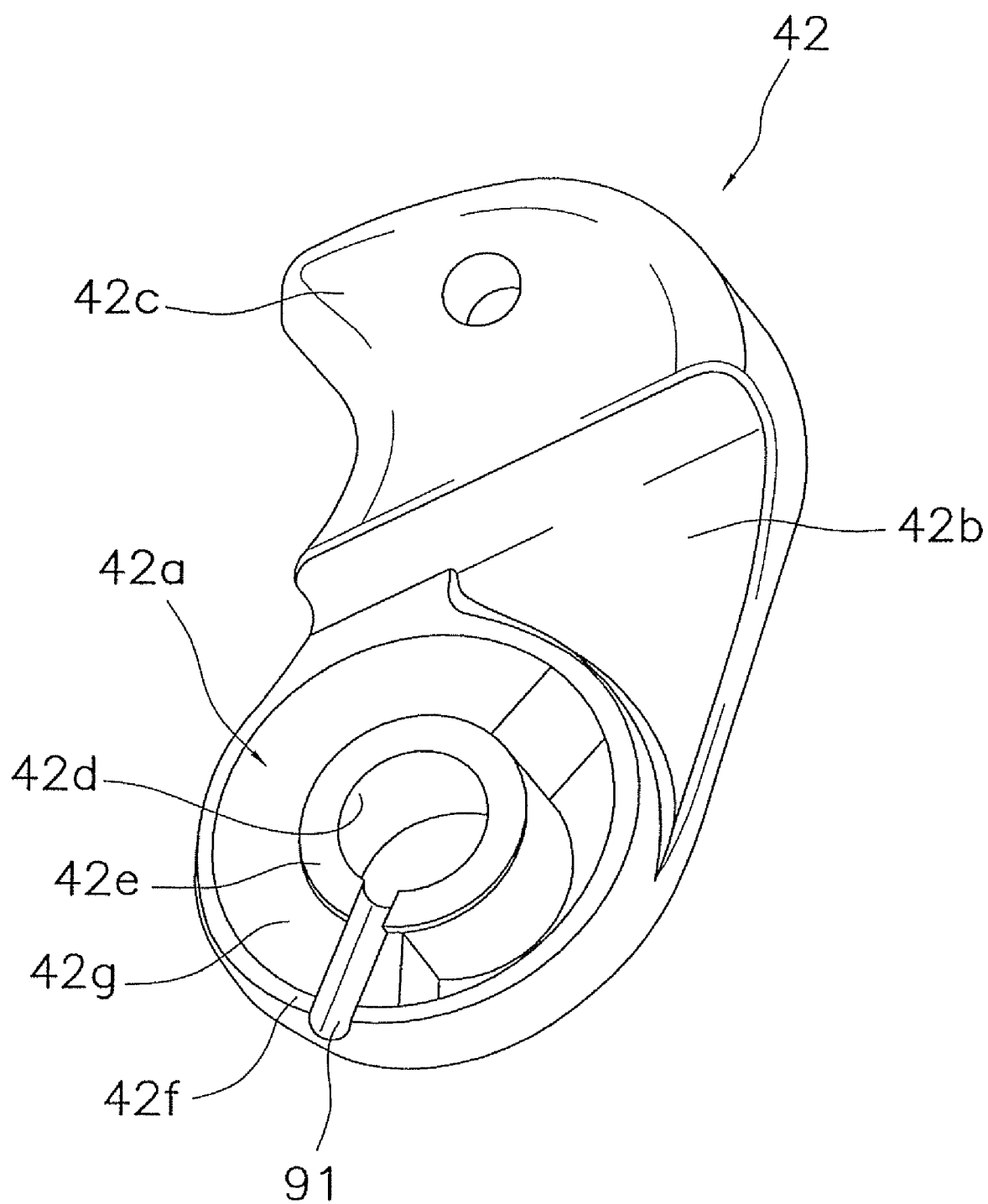
FIG. 14 is an oblique view of a second bail support member of the spinning reel.

As illustrated in FIG. 14, the second rotation support portion 42a is an annular portion including a through hole 42d in the center part thereof. The second pin member 32a is herein inserted into the through hole 42d for rotational support of the second rotation support portion 42a. Thus, a line extending in the center or the substantial center of the pin member and the through hole 42d represents the axis of rotation for the second bail support member 42. The second rotation support portion 42a includes an inner periphery 42e, an outer periphery 42f, and a main body 42g joined to both of the inner periphery 42e and the outer periphery 42f. A portion of the second rotation support portion 42a is configured to be exposed to the outside when the second bail support member 42 is positioned in the fishing line release posture. The second rotation support portion 42a includes a second lubricating port 91 configured to be used for lubrication. The second lubricating port 91 continuously penetrates the inner and outer peripheries 42e and 42f of the second rotation support portion 42a.

The second lubricating port 91 is a narrow lubricating port to supply the lubricant between the second bail support member 42 and the second rotor arm 32. The second lubricating port 91 is a through hole having a diameter that is relatively small but large enough to allow insertion of a lubricating nozzle. For example, the diameter of the second lubricating port 91 can vary from 0.5 mm to 2.0 mm. In this embodiment, as illustrated in FIG. 14, the diameter of the second lubricating port 91 is 1.5 mm. The second lubricating port 91 is formed as a recess in the second bail support member 42 and forms a through hole when the second bail support member 42 attaches to the second rotor arm 32. The second lubricating port 91 is formed in the second rotation support portion 42a configured not to be exposed to the outside in the fishing line guide posture. As illustrated in FIG. 14, the second lubricating port 91 is a through hole penetrating the inner and outer peripheries 42e and 42f joined to the main body 42g. When the lubricant is herein supplied between the second bail support member 42 and the second rotor arm 32, the second bail support member 42 is pivoted to the fishing line release posture. Under this condition, the lubricant is supplied to the inner periphery of the second rotation support portion 42a through the second lubricating port 91 exposed to the outside. In other words, the second lubricating port 91 extends in a direction that is not parallel to the axis of rotation of the second bail support member 42, preferably extends in a direction perpendicular or substantially perpendicular to the axis, and more preferably extends in a direction that intersects and is perpendicular or substantially perpendicular to the axis. Further, the second lubricating port 91 can be covered by a portion of the second rotor arm 32 when in the fishing line guide posture. When the second bail support member 42 is rotated on its axis to the fishing line release posture, the second lubricating port 91 is exposed.

Figure 16A:
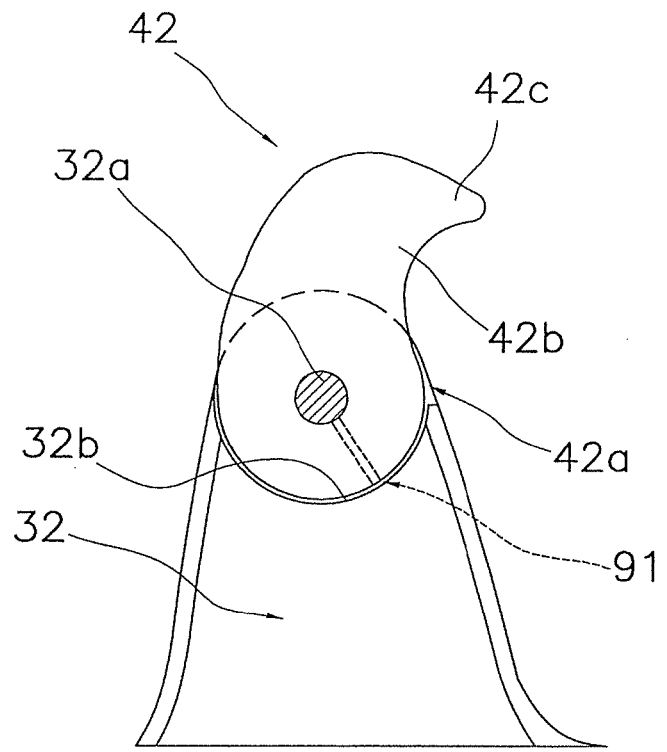
FIG. 16A is a perspective view of the second bail support member and a second rotor arm 32 from the outer periphery side when in the fishing line guide posture.
Figure 16B:
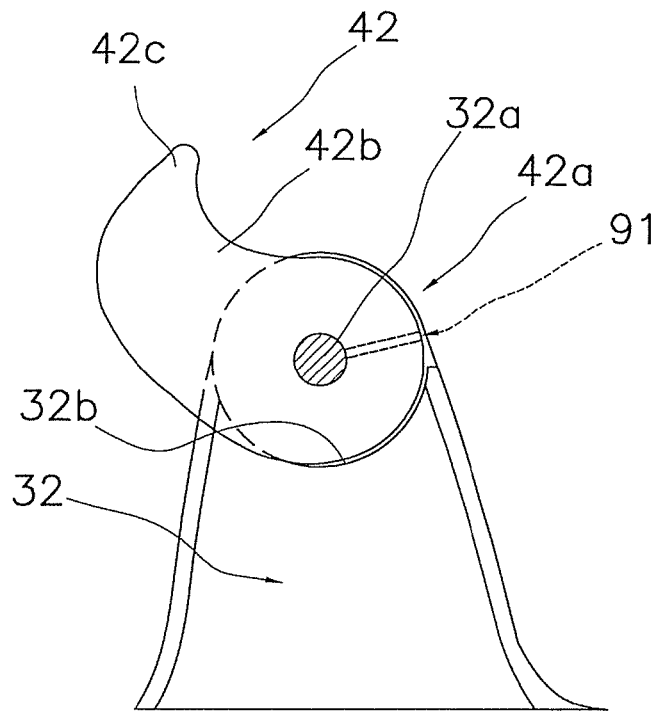
FIG. 16B is a perspective view of the second bail support member and the second rotor arm from the outer periphery side when in the fishing line release posture.

FIG. 16A shows the fishing line guide posture. The second lubricating port 91 is covered by the second step portion 32b of the second rotor arm 32 so that the second lubricating port 91 is not exposed to outside in the fishing line guide posture. FIG. 16B shows the fishing line release posture that the second bail support member 42 is pivoted. Thus, the second lubricating port 91 is exposed to outside in the fishing line release posture.

As seen in FIG. 3, the fixation shaft 45 is a member that protrudes from the distal end of the first bail support member 40. The fixation shaft 45 is configured to support the line roller 41 while allowing the line roller 41 to rotate. The fixation shaft 45 is a nut member made of e.g., an aluminum alloy. The fixation shaft 45 is an individual member formed separately from the fixation shaft cover 46. As illustrated in FIG. 3, the fixation shaft 45 extends from the base end thereof, i.e., an end closer to the fixation shaft cover 46, to the front end thereof, i.e., an end closer to the first bail support member 40. The front end of the fixation shaft 45 is fixed to the first bail support member 40 of the fixation bolt 47.

The fixation shaft cover 46 is disposed on the distal end, i.e., the base end, of the fixation shaft 45. The fixation shaft cover 46 has an outer diameter greater than that of the line roller 41. The fixation shaft cover 46 is disposed on the base end of the fixation shaft 45 while being separated from the attachment portion 40c of the first bail support member 40. The fixation shaft cover 46 is formed of cast molding, e.g., forging. The fixation shaft cover 46 is a roughly circular-cone shaped member having an apex displaced from the center thereof. With reference to the center of the fixation shaft 45, the apex of the fixation shaft cover 46 is directed rearward of the reel while being directed in a radial outward direction of the spool 4. The bail 43 is integrally formed with the fixation shaft cover 46 while being displaced to the fishing line guide side from the apex of the fixation shaft cover 46. The bail 43 is smoothly joined to a ridge portion formed in the vicinity of the apex of the fixation shaft cover 46.

As illustrated in FIG. 2, the tubular portion 30 of the rotor 3 houses an anti-reverse mechanism 50 in the interior thereof. The anti-reverse mechanism 50 is configured to prevent or to allow reverse rotation of the rotor 3. The anti-reverse mechanism 50 includes a one-way clutch 51 and a switch mechanism 52. The one-way clutch 51 is a roller-type clutch having an inner ring configured to rotate freely. The switch mechanism 52 is configured to switch the one-way clutch 51 between an activation state, i.e., a reverse rotation preventing state, and a deactivation state, i.e., a reverse rotation allowing state.

As illustrated in FIG. 2, the spool 4 is disposed between the first and second rotor arms 31 and 32 of the rotor 3. The spool 4 is attached to the distal end of the spool shaft 15 through the drag mechanism 60. As illustrated in FIG. 2, the spool 4 includes a bobbin trunk 4a, a skirt portion 4b, and a front flange portion 4c. The bobbin trunk 4a is a portion onto whose outer periphery fishing line is wound. The skirt portion 4b is a tubular portion integrally formed with the rear end of the bobbin trunk 4a. The front flange portion 4c is formed on the front end of the bobbin trunk 4a and has a large diameter, i.e., a diameter larger than that of the bobbin trunk 4a.

As illustrated in FIG. 2, the drag mechanism 60 is configured to brake rotation of the spool 4. The drag mechanism 60 includes a drag regulation knob 61 and a brake section 62. The drag regulation knob 61 is screwed onto the distal end of the spool shaft 15. The brake section 62 is configured to brake the spool 4 when being pressed by the drag regulation knob 61.

Next, an operation and an action of the reel will be hereinafter explained.

Referring to FIGS. 1 to 3, in casting, the bail arm 44 is flipped over to the fishing line release posture. The first and second bail support members 40 and 42 thereby pivot. Under this condition, an angler casts the fishing rod while hooking the fishing line with, e.g., the index finger of the hand holding the fishing rod. Consequently, the fishing line is released with high momentum due to the weight of a tackle. When the handle 1 is rotated in a fishing line winding direction after the tackle lands in the water, the rotor 3 is rotated in the fishing line winding direction by the rotor driving mechanism 5. The bail arm 44 is accordingly returned to the fishing line winding posture by a bail flipping mechanism (not illustrated in the figure). Reverse rotation of the rotor 3 is herein prevented. Therefore, release of the fishing line is stopped.

In winding the fishing line, the handle 1 is rotated in the fishing line winding direction. Rotation of the handle 1 is transmitted to the rotor 3 through the face gear 11 and the pinion gear 12. The rotor 3 is thereby rotated, and the fishing line guided onto the line roller 41 is accordingly wound onto the spool 4.

In the aforementioned bail arm 44 of a spinning reel, the first bail support member 40 includes the through hole 40e penetrating therethrough to make the inner periphery of the roller 41a of the line roller 41 extends toward the inner periphery of the roller 41a from the outside. Further, the cap member 80 is attached to the through hole 40e. The cap member 80 is made of a synthetic resin, e.g., synthetic rubber, and includes the lubricating port 80a to supply the lubricant therethrough. The lubricant is herein supplied to the inner periphery of the line roller 41 through the lubricating port 80a of the cap member 80 exposed to the outside. Unlike the well-known bail arm structure, supply of the lubricant is herein achieved without disassembling the first bail support member 40 and/or the pair of the fixation shaft 45 and the fixation shaft cover 46. Therefore, loss of components of the line roller 41 is prevented. Further, the lubricant can be easily supplied to the inner periphery of the line roller 41 without disassembling the first bail support member 40 and/or the pair of the fixation shaft 45 and the fixation shaft cover 46.

Referring now to FIGS. 1, 2, 13, and 14, in the aforementioned bail arm 44 of a spinning reel, the first lubricating port 90 is further formed in the first rotation support portion 40a configured to be exposed to the outside in the fishing line release posture of the first bail support member 40. The first lubricating port 90 continuously penetrates the inner and outer peripheries of the first rotation support portion 40a. In the aforementioned bail arm 44, the second lubricating port 91 is further formed in the second rotation support portion 42a configured to be exposed to the outside in the fishing line release posture of the second bail support member 42. The second lubricating port 91, used for lubrication, continuously penetrates the inner and outer peripheries of the second rotation support portion 42a. When the lubricant is supplied between the first bail support member 40 and the first rotor arm 31, the first bail support member 40 is pivoted to the fishing line release posture. The first lubricating port 90 is thereby exposed to the outside. The lubricant is supplied to the inner periphery of the first rotation support portion 40a through the exposed first lubricating port 90. When the lubricant is supplied between the second bail support member 42 and the second rotor arm 32, on the other hand, the second bail support member 42 is pivoted to the fishing line release posture. The second lubricating port 91 is thereby exposed to the outside. The lubricant is supplied to the inner periphery of the second rotation support portion 42a through the exposed second lubricating port 91.

Unlike well-known bail arm structures, supply of the lubricant is herein achieved without disassembling the first bail support member 40 and/or the second bail support member 42. Therefore, the lubricant can be easily supplied between the first bail support member 40 and the first rotor arm 31 without disassembling the first bail support member 40. Similarly, the lubricant can be easily supplied between the second bail support member 42 and the second rotor arm 32 without disassembling the second bail support member 42. Further in this case, the first lubricating port 90 is configured to be exposed to the outside in the fishing line release posture of the first bail support member 40 while being configured not to be exposed to the outside in the fishing line guide posture of the first bail support member 40. Similarly, the second lubricating port 91 is configured to be exposed to the outside in the fishing line release posture of the second bail support member 42 while being configured not to be exposed to the outside in the fishing line guide posture of the second bail support member 42. Unlike well-known bail arm structures, individual cap members are not thereby required for closing the first and second lubricating ports 90 and 91. In other words, spaces are not required for attaching the cap members to the first and second bail support members 40 and 42. Further, the number of components is not increased. Consequently, the first and second lubricating ports 90 and 91 can be formed with simple structures.

Other Exemplary Embodiments

Other exemplary embodiments will now be explained. The descriptions of the parts of the other embodiments that are identical to the parts of the first embodiment may be omitted for the sake of brevity.

(a) In the aforementioned exemplary embodiment, the bail 43 and the fixation shaft cover 46 are integrally formed, whereas the fixation shaft 45 and the fixation shaft cover 46 are formed as individual separate components. However, the bail 43, the fixation shaft 45, and the fixation shaft cover 46 may be integrally or unitarily formed. Alternatively, the bail 43, the fixation shaft 45, and the fixation shaft cover 46 may be formed as individual separate components. Further, materials and manufacturing methods of the bail 43, the fixation shaft 45, and the fixation shaft cover 46 are not limited to the aforementioned exemplary embodiment. For example, the bail 43, the fixation shaft 45, and the fixation shaft cover 46 may be made of any suitable metals excluding a stainless alloy and an aluminum alloy. Further, the bail 43, the fixation shaft 45, and the fixation shaft cover 46 may be manufactured by any suitable processing methods excluding forging and cutting.

(b) In the aforementioned exemplary embodiment, the bail arm 44 includes the second bail support member 42 and the bail 43. However, the present invention is applicable to the bail arm 44 of a bail-less type without the second bail support member 42 and the bail 43.

(c) In the aforementioned exemplary embodiment, the lubricating port 80a of the cap member 80 is formed by the first slanted portion 80b, the first tubular portion 80c, the second slanted portion 80d, and the second tubular portion 80e. However, the lubricating port 80a may be entirely formed by a single slanted portion having a diameter gradually reduced from the outer side to the inner inside. Alternatively, the lubricating port 80a may be entirely formed by a single tubular portion with a constant diameter that extends from the outer side to the inner side.

Figure 11:
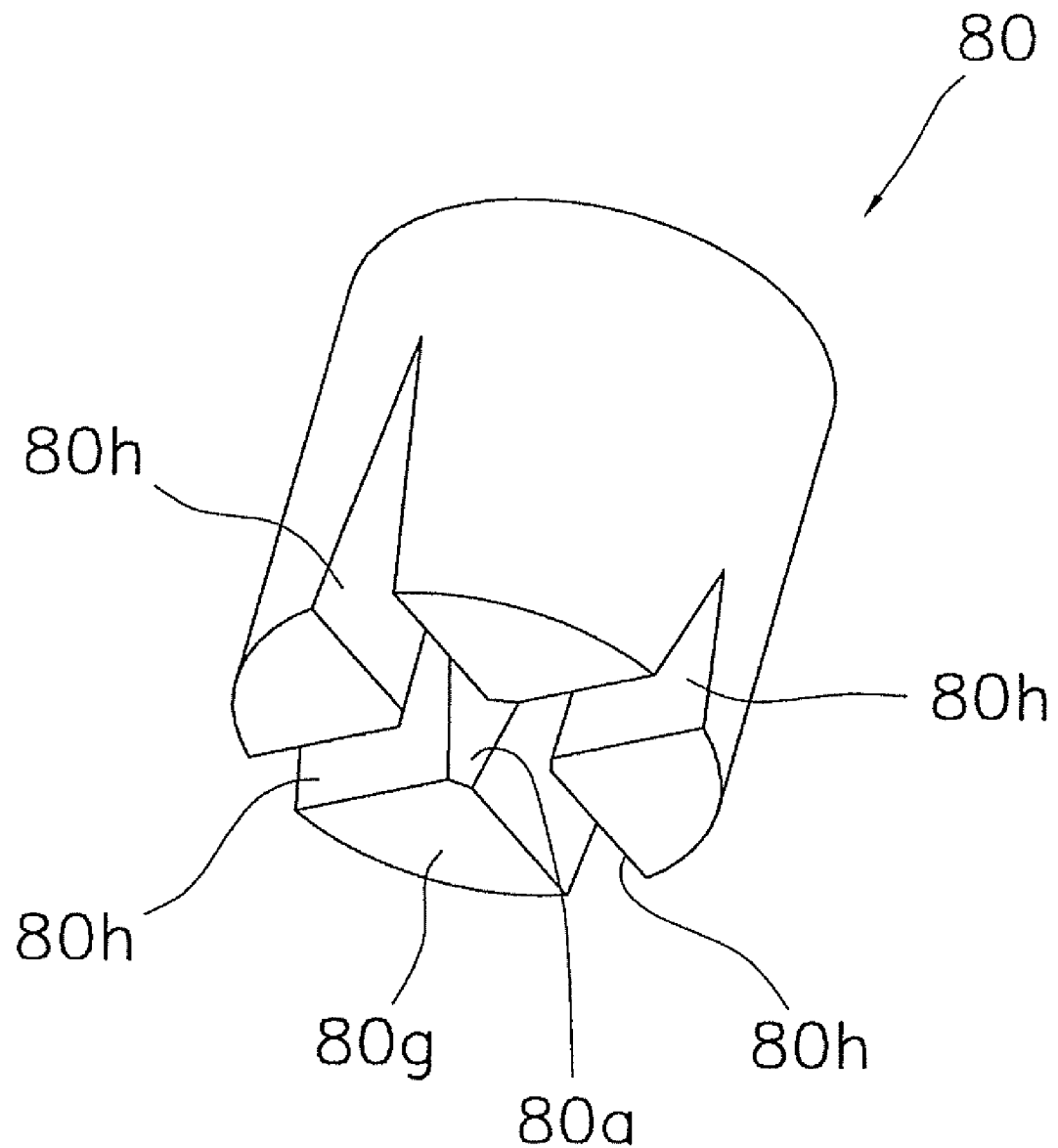
FIG. 11 is an enlarged oblique view of a cap member corresponding to FIG. 8 in accordance with another exemplary embodiment.

(d) In the aforementioned exemplary embodiment, the cap member 80 is a tubular member having the narrow lubricating port 80a in the center part thereof. As illustrated in FIG. 11, however, the cap member 80 may include four cutout portions 80h. The cutout portions 80h are formed by cutting out the outer surface 80g in an insertion direction of a lubricating nozzle. The respective cutout portions 80h are formed in a wedge shape. Seen from the outer surface 80g, the cutout portions 80h are arranged in a cross shape while the lubricating port 80a is arranged in the center of the cutout portions 80h arranged crisscross. In this case, the opening of the lubricating port 80a of the cap member 80 is closed by elastic force of a synthetic rubber. Therefore, salt, dirt, and the like are prevented from easily entering the interior of the lubricating port 80a.

Figure 12:
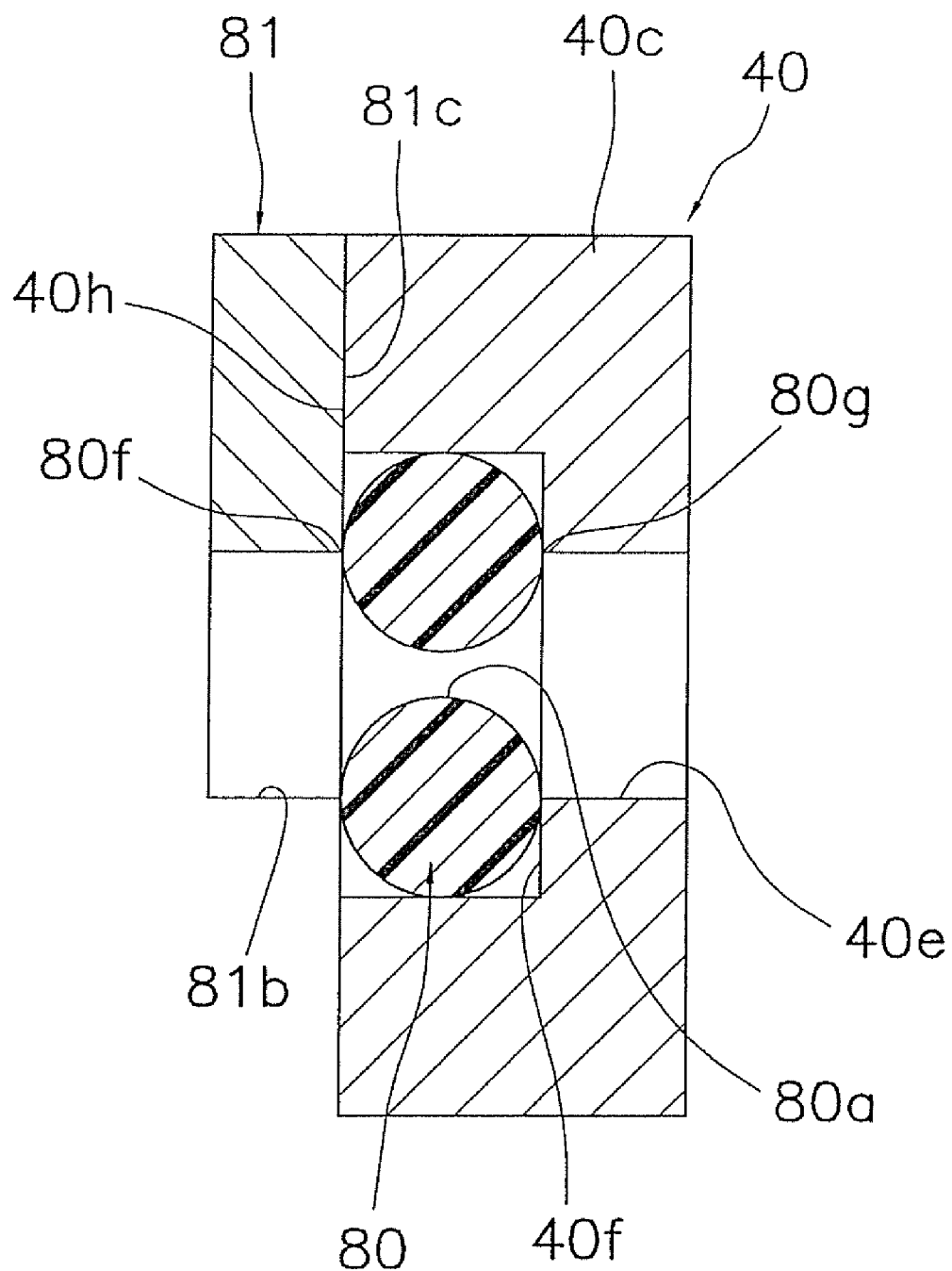
FIG. 12 is an enlarged cross-sectional view of a cap member a surrounding section thereof corresponding to FIG. 10 in accordance with still another exemplary embodiment.

(e) In the aforementioned exemplary embodiment, the cap member 80 is a tubular member having the narrow lubricating port 80a in the center part thereof. As illustrated in FIG. 12, however, the cap member 80 may be an annular member, e.g., an O-ring, having a hollow space as the lubricating port 80a in the center part thereof.

(f) In the aforementioned exemplary embodiment, the cap member 80 is attached to the through hole 40e of the first bail support member 40. However, the attachment structure of the cap member 80 is not limited to this. For example, the cap member 80 may be attached to a through hole penetrating the fixation shaft 45 and/or the fixation shaft cover 46 for making the inner periphery of the roller 41a of the line roller 41 for extending toward the inner periphery of the roller 41a from outside.

(g) In the aforementioned exemplary embodiment, the first lubricating port 90 is formed by the first through hole 90a and the second through hole 90b. However, the first lubricating port 90 may be formed by a single through hole when the first rotation support portion 40a does not include the hollow portion 40l. On the other hand, the second lubricating port 91 may be formed by two through holes when the second rotation support portion 42 includes an inner flanged portion, an outer flanged portion, and a hollow portion. In this case, each of the inner flanged portion and the outer flanged portion has a through hole.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a reel equipped with a fishing line guide mechanism. Accordingly, these terms, as utilized to describe the present invention should be interpreted relative to a reel equipped with a fishing line guide mechanism as normally used. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spinning-reel fishing line guide mechanism configured to guide a fishing line onto a spool, the spinning-reel fishing line guide mechanism attached to a distal end of a first rotor arm, the spinning-reel fishing line guide mechanism being pivotable between a fishing line guide posture and a fishing line release posture, the spinning-reel fishing line guide mechanism comprising:

a first support member pivotably attached to the distal end of the first rotor arm;

a fixation shaft having first and second axial ends, the fixation shaft being fixed to the first support member via the first axial end;

a line roller rotatably supported by the fixation shaft, the line roller including a roller on a circumference thereof, the roller configured to guide the fishing line;

a fixation shaft cover attached to the second axial end of the fixation shaft, the fixation shaft cover separated from the first support member by a predetermined interval, the fixation shaft cover configured to lead the fishing line onto the line roller on an outer periphery thereof; and a cap member being made of synthetic resin and having a lubricating port allowing a lubricant to be supplied between the first support member and the fixation shaft cover, either the first support member or a pair of the fixation shaft and the fixation shaft cover having a through hole, the through hole extending toward an inner periphery of the roller from outside the roller, and the cap member being attached to the through hole to close the through hole.

2. The spinning-reel fishing line guide mechanism according to claim 1, wherein the through hole is formed in the first support member.

3. The spinning-reel fishing line guide mechanism according to claim 2, wherein the first support member includes a recess that recedes toward the fixation shaft and surrounds a part of the first support member where the fixation shaft is attached, and the through hole is formed in the recess, a distance between the through hole and the part of the first support member where the fixation shaft is attached is shorter than a distance between the through hole and the inner periphery of the recess.

4. The spinning-reel fishing line guide mechanism according to claim 1, wherein the lubricating port is a through hole having a diameter that is small but enough to allow insertion of a lubricating nozzle.

5. The spinning-reel fishing line guide mechanism according to claim 1, wherein the cap member is attached to the through hole from an inner peripheral side of the roller.

6. The spinning-reel fishing line guide mechanism according to claim 5, wherein the cap member is retained by a plate shaped retainer member.

7. The spinning-reel fishing line guide mechanism according to claim 1, wherein the cap member is a tubular member including the lubricating port in a center part thereof.

8. The spinning-reel fishing line guide mechanism according to claim 1, wherein the line roller further includes a tubular member that is attached to the inner periphery of the roller as an individual component, the tubular member includes a cutout, and the cutout communicates with the through hole and the inner periphery of the roller.

9. The spinning-reel fishing line guide mechanism according to claim 1, further comprising a first lubricating port to supply the lubricant therethrough, the first lubricating port is formed in a first rotation support portion of the first rotation member and pivotably attaches to the first rotor arm, the first lubricating port continuously penetrates inner and outer peripheries of the first rotation support portion, and the first rotation support portion is exposed to the when the first support member is in the fishing line release posture.

10. The spinning-reel fishing line guide mechanism according to claim 9, wherein the first lubricating port is a through hole having a diameter that is small but enough to allow insertion of a lubricating nozzle.

11. The spinning-reel fishing line guide mechanism according to claim 10, wherein the first rotation support portion includes
an inner flanged portion that protrudes in an inner periphery of the first rotation support portion,
an outer flanged portion that protrudes in an outer periphery of the first rotation support portion, and
a hollow portion formed between the inner flanged portion and the outer flanged portion, and
the first lubricating port includes
a first through hole formed in the inner flanged portion, and a second through hole formed in the outer flanged portion, the second through hole communicating with the hollow portion and the first through hole.

12. The spinning-reel fishing line guide mechanism according to claim 9, wherein the first lubricating port formed in the first rotation support portion is covered in the fishing line guide posture.

13. The spinning-reel fishing line guide mechanism according to claim 1, further comprising a second support member attached to a distal end of a second rotor arm opposed to the first rotor arm through a rotational axis of a rotor, the second support member being pivotable between the fishing line guide posture and the fishing line release posture, and a bail fixed to the second support member and at least one of the fixation shaft and the fixation shaft cover with both ends thereof, the bail disposed on the outside of a circumference of the spool in a curved shape, and the bail configured to lead the fishing line onto the line roller through the fixation shaft cover.

14. The spinning-reel fishing line guide mechanism according to claim 13, wherein the second support member has
a second rotation support portion, and
a second lubricating port to supply the lubricant therethrough formed in the second rotation support portion,
the second lubricating port continuously penetrates inner and outer peripheries of the second rotation support portion, and
the second rotation support portion is exposed when the second support member is in the fishing line release posture.

15. The spinning-reel fishing line guide mechanism according to claim 14, wherein the second lubricating port is a through hole having a diameter that is small but enough to allow insertion of a lubricating nozzle.

16. The spinning-reel fishing line guide mechanism according to claim 15, wherein the second rotation support portion includes a main body joined to the inner and outer peripheries thereof,
the second lubricating port is a through hole penetrating the inner and outer peripheries joined to the main body.

17. A spinning-reel fishing line guide mechanism configured to guide a fishing line onto a spool, the spinning-reel fishing line guide mechanism attached to a distal end of a rotor arm, the spinning-reel fishing line guide mechanism being pivotable between a fishing line guide posture and a fishing line release posture, the spinning-reel fishing line guide mechanism comprising:

a pivot member pivotably attached to the distal end of the rotor arm;
a communication hole formed on an outer peripheral surface of the pivot member, the communication hole continuously penetrating outer and inner peripheries of the pivot member;
a thorough hole formed on the pivotal member and extending toward an inner periphery from an outer periphery of the pivotal member; and
a fixation bolt being inserted in the through hole.

* * * * *

UNITED STATES PATENT AND TRADEMARK OFFICE
CERTIFICATE OF CORRECTION

PATENT NO. : 7,967,232 B2
APPLICATION NO. : 12/880593
DATED : June 28, 2011
INVENTOR(S) : Hirokazu Hiraoka et al.

Page 1 of 1

It is certified that error appears in the above-identified patent and that said Letters Patent is hereby corrected as shown below:

In column 21, line 47, delete "to the".

Signed and Sealed this
Twentieth Day of December, 2011

David J. Kappos
*Director of the United States Patent and Trademark Office*